Dec. 9, 1958 M. A. CLEMENT 2,863,958

TELEPHONE IDENTIFICATION TEST SYSTEM

Filed Dec. 2, 1955 8 Sheets-Sheet 1

Inventor:
Milton A. Clement
Francis E. Blake
Attys.

Dec. 9, 1958 M. A. CLEMENT 2,863,958

TELEPHONE IDENTIFICATION TEST SYSTEM

Filed Dec. 2, 1955 8 Sheets-Sheet 3

Dec. 9, 1958 M. A. CLEMENT 2,863,958

TELEPHONE IDENTIFICATION TEST SYSTEM

Filed Dec. 2, 1955 8 Sheets-Sheet 4

Dec. 9, 1958 M. A. CLEMENT 2,863,958

TELEPHONE IDENTIFICATION TEST SYSTEM

Filed Dec. 2, 1955 8 Sheets-Sheet 5

Dec. 9, 1958 M. A. CLEMENT 2,863,958

TELEPHONE IDENTIFICATION TEST SYSTEM

Filed Dec. 2, 1955 8 Sheets-Sheet 6

TELEPHONE IDENTIFICATION TEST SYSTEM

Filed Dec. 2, 1955 8 Sheets-Sheet 8

United States Patent Office 2,863,958

Patented Dec. 9, 1958

2,863,958

TELEPHONE IDENTIFICATION TEST SYSTEM

Milton A. Clement, Rochester, N. Y., assignor to General Dynamics Corporation, a corporation of Delaware Application December 2, 1955, Serial No. 550,595

25 Claims. (Cl. 179—175.2)

Figure 1:
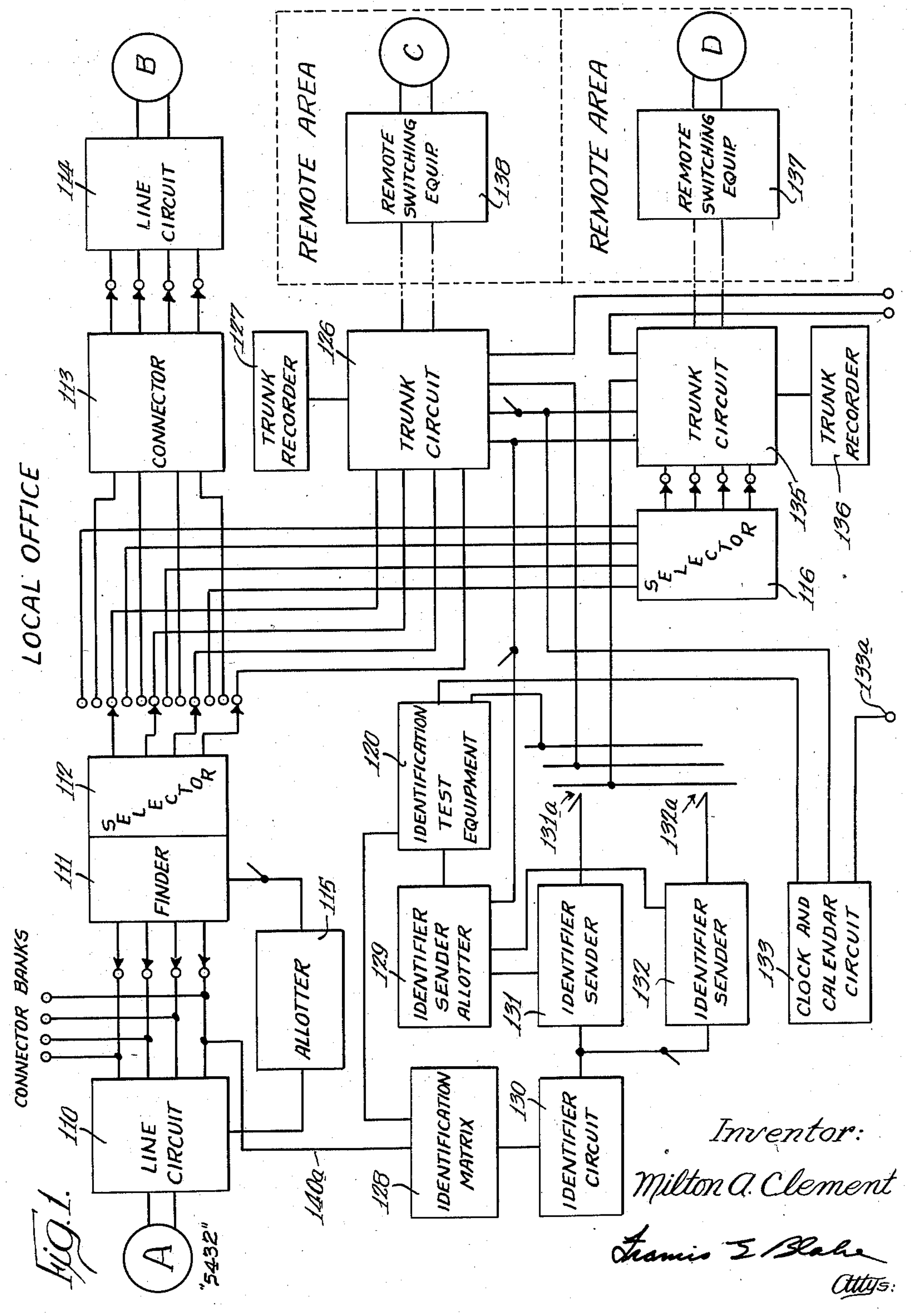

This invention relates to a telephone system and, more particularly, to a system for testing subscriber identifying means.

With the increasing use of automatic toll ticketing systems which provide records of various items of data pertaining to long and short haul toll calls, a need has arisen for testing equipment which is capable of determining the operating condition of the toll ticketing equipment either prior to cutover or after the toll ticketing facilities have been in use for a period of time. Among the items of information which are collected and recorded by the toll ticketing facilities is the designation identifying the calling subscriber involved in each of the toll calls to be ticketed. A number of different circuits have been developed for automatically determining this information, and many of these circuits include a permanent connection from the identifying means to apparatus or circuits individual to the calling subscriber, such as a line circuit. Since these connections are added to existing telephone systems when the automatic toll ticketing facilities are installed and since these connections are changed when the directory numbers of subscribers are changed, it is desirable to check the accuracy of these connections prior to a system cutover or following a change in the assignment of directory numbers. Further, the identifying means commonly have register senders including digit storage means and digit sending means which are either individually associated with the identifying means or associated therewith during an identifying operation, and it is desirable to be able to quickly and easily determine the operating condition of these register sender components both prior to a cutover of an installed system and at other periodic intervals during the use of the toll ticketing facilities.

Accordingly, one object of the present invention is to provide testing means for telephone systems.

Another object is to provide means for testing subscriber identifying means.

Another object is to provide a telephone system including calling subscriber identification testing means.

A still further object involves the provision of automatically operated means for checking the operation of calling subscriber identifying equipment at selected intervals.

Another object is to proivde a telephone system including means for simulating a calling condition to test the operation of subscriber identifying means.

Another object is to provide a testing device including means for establishing known subscriber identification data and other means for causing subscriber identifying means to attempt to establish the same known identification data.

A still further object involves the provision of a testing device for use wih means for identifying multidigit subscriber identification designations which includes means for checking the establishment of each of the digits in each of the orders of the designation.

In accordance with these and many other objects, one embodiment of the invention comprises identification test equipment including a rotary program switch which is placed in operation at selected time intervals to sequentially establish a plurality of known subscriber designations in the test equipment and to sequentially supply test signals to the subscriber identifying means associated with the toll ticketing equipment. In addition, the test equipment causes the association of the subscriber identifying means with the test equipment so that the subscriber identifying means is operated by the test signals applied thereto to transmit digit manifesting signals to the test equipment. These signals are received and stored in register means forming a portion of the identification test equipment and compared with the previously established known designations. In the event that the designations are identical, the program switch continues to establish different known designations and to apply corresponding test signals to the subscriber identifying means. However, in the event that the digital information transmitted by the subscriber identifying means to the test equipment does not exactly correspond with the known designation previously established in the test equipment, an alarm condition is established indicating the failure of the subscriber identifying means. Following the establishment of a preselected series of known designations by the test equipment, the routining operation is terminated until a start condition is established following the expiration of a selected interval of time. In this manner, the identification test equipment automatically checks the operation of the subscriber identifying means at selected intervals and without a need for manual intervention of any type.

In addition, the identification test equipment includes means for manually checking any selected subscriber designations. More specifically, the test equipment includes a plurality of selector switches which are manually set to indications representing a predetermined subscriber designation. A connection is manually established from the identification test equipment to a portion of the switching means of the telephone system which is individual to the calling subscriber whose designation is to be checked. This manual connection provides a means for applying a test signal from the identification test equipment through the permanent connections associated with a circuit component, such as the line circuit of the calling subscriber, to the automatic subscriber identifying means of the toll ticketing facilities. This test signal selectively energizes the subscriber identifying means to transmit digit representing signals to the register means in the identification test equipment. Following the transmission of this digital information, the settings of the registers in the identification test equipment are compared with those of the manually adjusted switches. If the designation of the calling subscriber has been correctly identified, the testing operation is terminated. On the other hand, in the event that the designation of the calling subscriber, as determined by the subscriber identifying means, does not correspond with the designation manually established in the identification test equipment, an alarm indication is provided.

Figure 6:
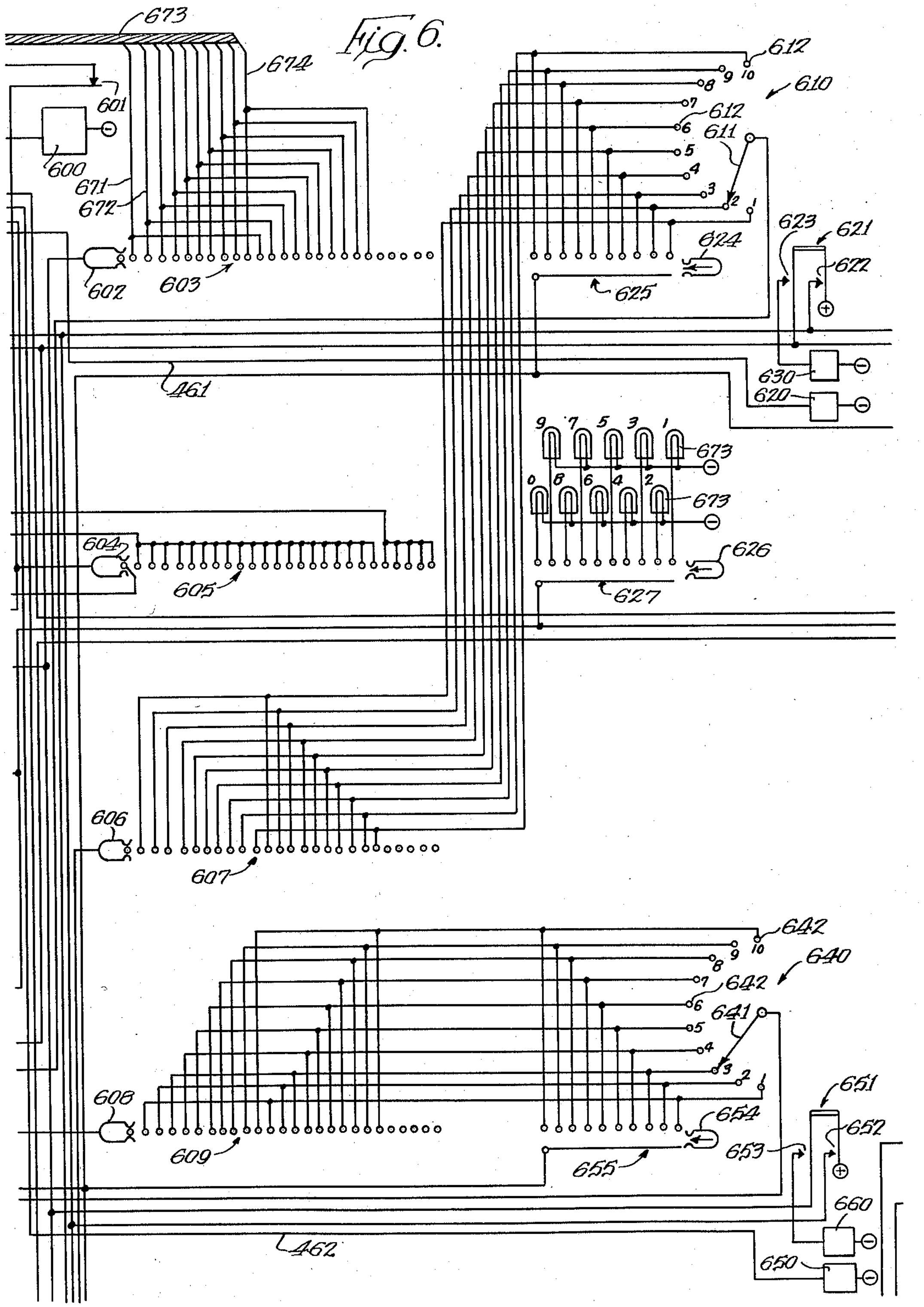
Figure 7:
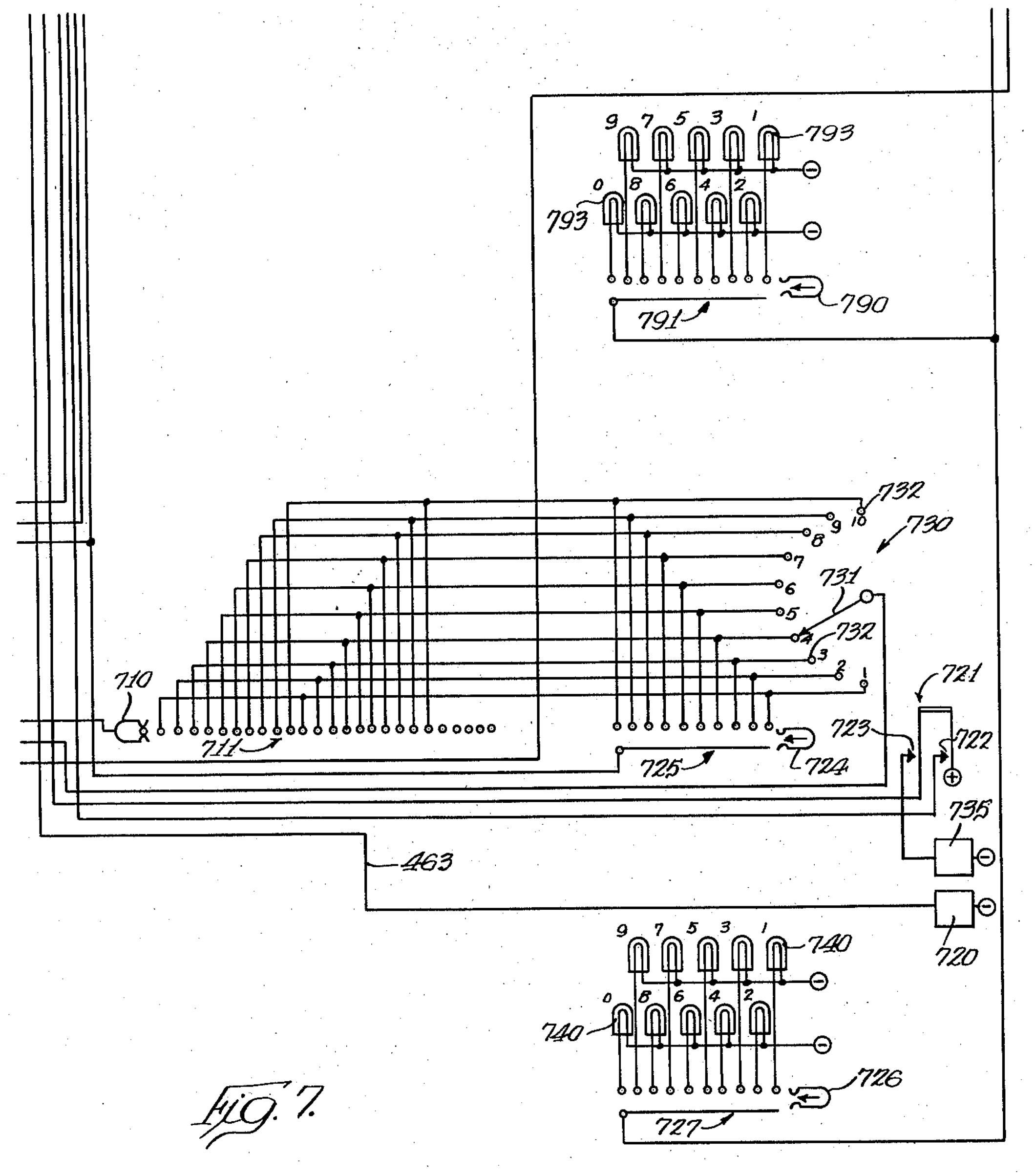
Figures 8, 9:
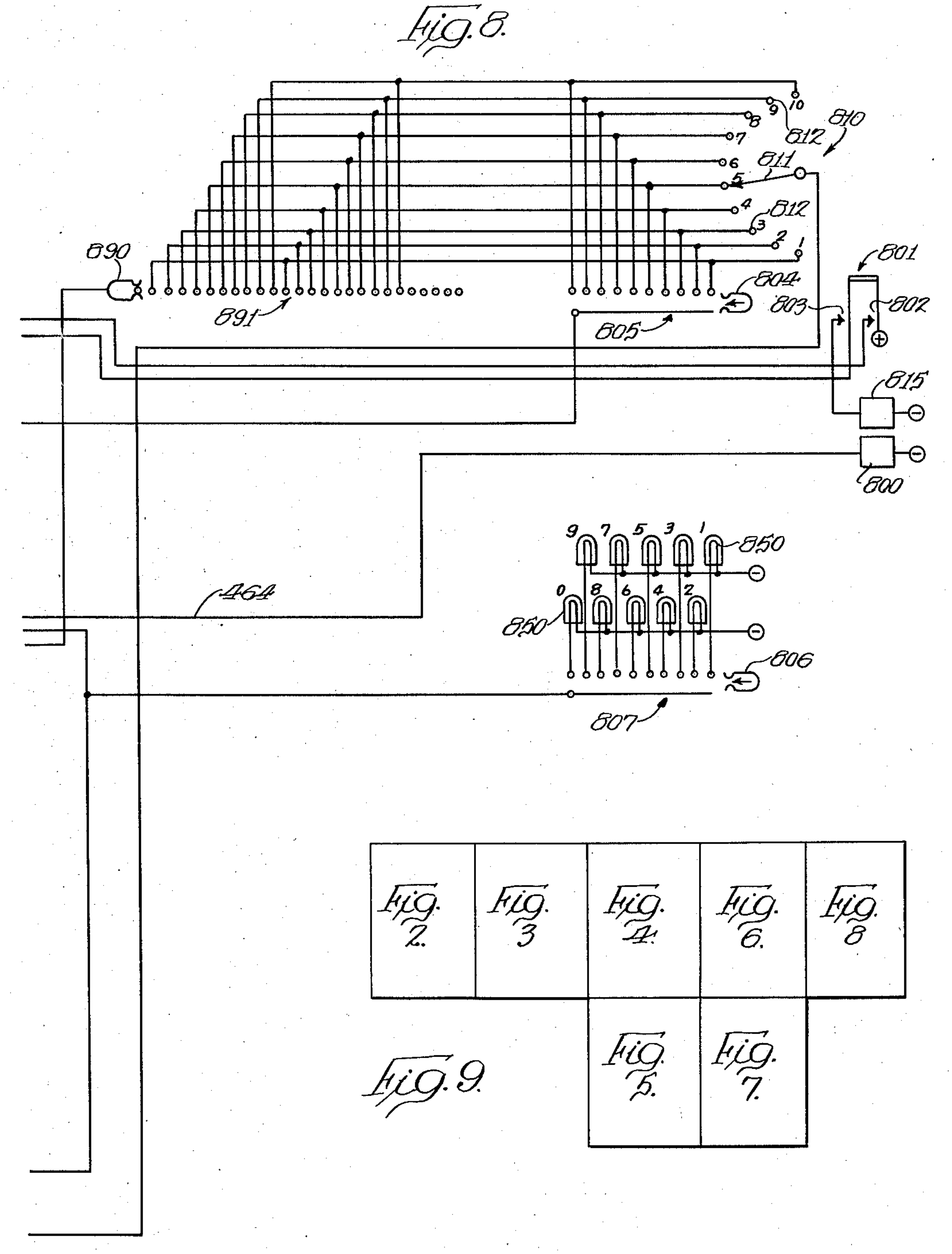

Many other objects and advantages of the present invention will be apparent from a consideration of the following description when taken in conjunction with the following drawings in which:

Fig. 1 is a block diagram showing the identification test equipment of the present invention in conjunction with a portion of a toll ticketing system;

Figs. 2 to 8, inclusive, are schematic drawings illustrating the details of the identification test equipment; and Fig. 9 is a block diagram indicating the manner in which Figs. 2 to 8, inclusive, of the drawings are positioned adjacent each other to form a single circuit diagram of the identification test equipment of the present invention.

Referring now to Fig. 1 of the drawings, the identification test equipment of the present invention is shown therein as being adapted for use in conjunction with an automatic toll ticketing system of the type disclosed in the copending application of Frank A. Morris, Howard L. Foote, Milton A. Clement and Ben A. Harris, Serial No. 536,571, filed September 26, 1955, which copending application is assigned to the same assignee as the present application. However, it is apparent that the operating principles of the subscriber identification testing means of the present invention may be utilized in affording automatic testing means for many other variations of toll ticketing equipment. In order to understand the correct normal operation of the automatic calling subscriber identifying facilities which are to be tested by the identification test equipment of the present invention, a brief description of the operation of the information collecting and storing components of the toll ticketing system disclosed in the above identified application is set forth below.

Calls extended between local substations A and B are not ticketed inasmuch as a toll charge is not applied to these calls. The local nonticketed call is initiated by the subscriber at the substation A lifting the handset to actuate the cradle switch to close a calling loop circuit over a line circuit 110 in the local office to mark the calling line in the bank of contacts of the finders having access to this line and to apply start ground potential to a common allotter start lead extending to a link allotter 115. This allotter first functions to find an idle link in the group having access to the calling line and, following the seizure of an idle link comprising a finder and a selector, a finder, such as the finder 111, operates in conjunction with the allotter 115 to step the wipers thereof in two directions until the wipers are moved into engagement with the contacts terminating the line multiple individual to the line circuit 110. When the line finding operation is thus completed, the allotter 115 is dismissed, and the calling loop circuit is extended through the finder 111 to a selector 112 which forms the other portion of the seized link. In response to this operation, the selector 112 returns dial tone to the calling subscriber at the substation A to indicate that the dialing operation can be initiated.

The subscriber at the substation A thereafter dials the necessary digits for extending the connection to the called local substation B, which connection extends through a connector 113 and a line circuit 114. When the connection between the substations A and B is released, either upon release by the calling party or the last party, the connector 113 removes the holding ground potential from the sleeve conductor of the extended connection, thereby permitting the circuit components 110 to 114 to restore to a normal condition.

The automatic calling subscriber identifying means provided in the toll ticketing system, shown in the block diagram of Fig. 1, are placed in use to automatically determine the designation identifying the calling subscriber, such as the subscriber at the substation A, when a call is placed to a substation, such as the substation C, which is located in a remote area. A toll call is initiated at the substation A in the same manner described above in conjunction with the local call by the subscriber removing the handset from the cradle, thus closing the cradle switch and extending the calling loop to the line circuit 110. Thereafter, the allotter 115 is operated to cause the extension of the calling line loop through the finder 111 to the selector 112.

The first digit dialed at the substation A is an access digit which operates the selector 112 to select a bank contact level in which are terminated the trunk circuits extending to the remote area in which is located the called substation C. During the interdigit pause following the first dialed digit, the selector 112 automatically moves its wipers across the bank contacts of the selected level to test the trunk circuits to determine the idle or busy condition thereof and switches through to the first trunk circuit, such as a trunk circuit 126, which tests idle. In seizing the idle trunk circuit 126, the selector 112 switches the calling loop circuit through to the trunk circuit 126 and thus conditions this circuit for receiving the next dialed digit.

The next or party digit which is dialed by the subscriber at the substation A is the first entry recorded in a trunk recorder 127 individually associated with the trunk circuit 126 and is not utilized for extending the connection to the called substation C. This digit has significance in determining the directory number of a calling subscriber on a multiparty line but, since it is desirable to provide identical numbers of units of information in the trunk recorder 127 in conjunction with all types of toll calls, all subscribers are required to dial the party digit. The trunk recorder 127, in which the party digit and the remaining ticketing data are recorded, comprises an endless loop of magnetic tape having mark and space pulse transducing heads disposed adjacent laterally spaced contiguous areas of the magnetic tape, thereby to provide two effective channels on the magnetic tape for receiving mark and space pulse information. The value of the digital information is recorded on the magnetic tape by providing a number of mark pulses on one of the channels of the tape which is representative thereof, and successive items of digital information are separated from each other by the interposition of a single space pulse in the other channel thereof. During recording operations, the magnetic tape is advanced step by step following the recording of each discrete pulse thereon under the control of the trunk circuit 126.

Accordingly, the dialing of the assigned party digit by the subscriber at the substation A causes the trunk circuit 126 to provide a number of separate mark pulses on the magnetic tape of the trunk recorder 127 which is equal to the value of the party digit and, thereafter, the trunk circuit 126 records a space pulse on the tape to separate the party digit from subsequent items of information which are to be stored thereon.

The calling subscriber next dials the digits required to extend the connection to the called substation C which may comprise the seven digits forming a conventional 2–5 numbering code, i. e. three office code digits and four station number digits. The value of each of the dialed digits is directly recorded on the magnetic tape of the trunk recorder 127 in the form of a group of mark pulses including a number of pulses equal to the value of the dialed digit followed by a space pulse. A stepping switch in the trunk circuit 126 is operated during the interdigit pauses separating the seven dialed digits to count the number of digits dialed. Following the counting of a selected number of digits, i. e. seven, the trunk circuit 126 prevents the recording of any additional dialed digits on the tape of the trunk recorder 127.

Following the completion of the connection to the substation C and also following the receipt of answering supervisory signals therefrom, the trunk circuit 126 places a common clock and calendar circuit 133 in operation to transmit seven groups of mark pulses separated by space pulses to the trunk recorder 127 to represent the date and time at which the call is filled. The clock and calendar circuit 133 includes separte date and time register switches all of which are sequentially operated under the control of one per minute impulses delivered from a timer cam and pulsing contact arrangement. In this manner, the wipers of the plurality of stepping switches are continuously adjusted to positions representing the values of the tens and units minutes digits, the tens and units hours digits, the tens and units days digits, and a digital designation representing the month of the year. These register switches, in addition to supplying date and time pulses, provide start signals at selected intervals to a terminal 133*a* for initiating operation of the toll ticketing recording means and to the test equipment to initiate a routining operation thereof.

Following the completion of the transmission of the date and time information to the trunk recorder 127, ground is applied from the trunk circuit 126 over a common allotter start lead extending to an identifier sender allotter circuit 129. The allotter circuit 129 is associated with a plurality of independent identifier sender-trunk finders, such as the elements 131 and 132, and, in response to the receipt of start ground on the allotter start lead, associates an idle identifier sender 131 with the trunk circuit by operating a trunk finder switch 131*a* to search for and seize the trunk circuit 126. In addition, the identifier sender allotter circuit 129 causes the operation of a cut-through relay individual to the seized identifier sender 131 to interconnect this circuit with an identifier circuit 130 which is common to all of the identifier sender-trunk finders.

Following the association of the seized identifier sender 131 with both the trunk circuit 126 and the identifier circuit 130, the allotter 129 operates an identification relay in the trunk circuit 126 to apply an identification tone back over the HS lead of the extended switch train to a lead 140*a* individual to the calling line circuit 110. This lead or terminal is selectively interconnected with an identification matrix 128 in accordance with the digits forming the directory number of the calling substation A, e. g. "5432."

The identification matrix 128 comprises ten individual party matrices and a terminal per line matrix. Each of the individual matrices comprises ten thousands, hundreds, tens, and units busses which are selectively interconnected with each of the individual line circuits through a plurality of resistors to provide passive element matrices. In response to the application of the alternating current identification potenial to the HS terminal or the lead 140*a* individual to the calling line circuit 110, a voltage is applied over one each of the thousands, hundreds, tens, and units conductors in accordance with the values of the digits forming the directory number of the calling substation A.

If the calling substation is located on a line on which party service is provided on a terminal per line basis, the HS terminal of the calling line circuit is connected to the busses in the terminal per line matrix in accordance with the values of the common thousands, hundreds, and tens digits of the directory number of the substation. The value of the units digit is determined by the value of the party digit dialed by the subscriber which is recorded on the tape of the trunk recorder 127, and, accordingly, the units resistor of the four element cluster individual to a multiparty terminal per line circuit is connected to any arbitrary bus. The arbitrary bus preferably is one representing a low value digit in order to reduce the number of mark pulses which are subsequently stored in the trunk recorder and, accordingly, to reduce the length of the magnetic tape which is required to store this digit.

In this manner, single thousands, hundreds, tens, and units busses extending to the input of the common identifier circuit 130 are selectively energized in accordance with the values of the four digits forming the directory number of the calling substation A.

The identifier circuit 130 comprises four denominationally ordered groups of ten amplifier-detector channels having output tubes. When the identifier circuit 130 is energized by the signals supplied over the thousands, hundreds, tens, and units leads, a single digit manifesting output tube is fired in each of the thousands, hundreds, tens and units denominational groups of tubes, thereby causing the operation of correspondingly designated relays in the seized identifier sender circuit 131. Since the operation of these relays completes the determination of the calling line directory number, the operated identifier sender 131 signals the allotter circuit 129 to release both the common identifier circuit 130 and the identification matrix 128 so that these components are free to be associated with another identifier sender, such as the element 132, without waiting for the operated identifier sender 131 to complete the transmission of the information stored therein to the trunk recorder 127.

The identifier sender 131, which may be of the type disclosed in the copending application of Ben A. Harris, Serial No. 536,578, filed September 26, 1955, and which copending application is assigned to the same assignee as the present application, includes four groups of ten register sender relays which are operated to store the values of the four digits comprising the directory number of the calling subscriber. In addition to registering the values of these digits, the four groups of relays in the identifier sender provide pulsing or sending means for transmitting groups of mark pulses to the trunk recorder 127 of the seized trunk circuit 126 in accordance with the values of these stored digits. The identifier sender 131 also includes a group of steering relays which are sequentially released in the intervals between the release of each of the groups of register relays, thereby to transmit four groups of mark pulses to the trunk recorder 127 with space pulses interposed therebetween. Following the transmission of the mark pulses representing the thousands, hundreds, tens, and units digits of the directory number of the calling substation A, the identifier sender-trunk finder 131 is released and disconnected from the trunk circuit 126.

In the event that an adequate calling subscriber identification is not transmitted to the identifier sender 131 during a calling line identification operation, the seized identifier sender 131 provides a signal for the trunk circuit 126 which causes the application of busy tone to the extended connection and also transmits four space pulses to the trunk recorder 127 in place of the four missing digits of the designation of the calling substation.

Following the completion of the storage of the calling subscriber identification information in the trunk recorder 127, mark pulses are recorded on the tape in the recorder 127 at one minute intervals to provide a record of the length of the toll call. When supervisory signals are received by the trunk circuit 126 indicating that the connection has been terminated, the trunk circuit transmits a space signal to the recorder 127 followed by a COE signal comprising simultaneous mark and space pulses which indicates the end of the call. The termination of the call releases the switching equipment including the finder 111 and the selector 112 and also releases the trunk circuit 126 to permit this equipment to be seized for use in extending and completing additional toll calls.

Toll calls to a substation D, also located in a remote area, are extended and ticketed in the manner described above by the use of an additional selector 116, a trunk circuit 135 having an individually associated trunk recorder 136, and remote switching equipment 137. The calling subscriber identifying means including the identifier sender allotter 129, the identification matrix 128, the identifier circuit 130, and the identifier senders 131 and 132 are common to all of the trunk circuits located in a particular area or office, and, accordingly, provide calling subscriber identification information to the trunk recorder 136 for calls extended from the local office to the remote office in which is located the substation D.

Therefore, the subscriber identifying means which are to be checked by the identification test equipment of the present invention includes an identification matrix 128 having a plurality of resistance clusters, one of which is selectively energized by means of a conductor individual to a calling line circuit to provide four selectively energized common busses representing the values of the thousands, hundreds, tens, and units digits of the calling substation designation which terminate in the input to the common identifier circuit 130. This circuit includes amplifying detecting means for each of the common busses so that the four selectively energized busses selectively operate four output tubes which complete conductive paths for operating register relays in one of a plurality of identifier senders 131 or 132 which has previously been associated with the identifier circuit 130 and with a calling trunk circuit, such as the trunk circuit 126, by the identifier sender allotter 129. Following the establishment of the four digits forming the directory number of the calling subscriber in the seized identifier sender, the identifier circuit 130 and the identification matrix 128 are released by the identifier sender allotter 129 to permit the seized identifier sender to transmit four groups of mark pulses separated by space pulses to a trunk recorder, such as the recorder 127.

In order to check the operation of this subscriber identifying means, an identification test equipment 120 is provided. To initiate a routine operation of the test equipment 120 for checking the operation of the amplifying and detecting components in the identifier circuit 130 and of the registering and pulsing means in the identifier senders 131 and 132, the common clock and calendar circuit 133 applies a start ground signal to the unit 120 at selected intervals of time. In the routining operation, the test equipment 120 applies a start signal to the identifier sender allotter 129 and provides marking in the terminal banks of the finder switches **131*a* and 132*a* to mark the identification test equipment 120 for association with one of the identifier senders 131 or 132. The start signal supplied to the identifier sender allotter 129 causes an idle identifier sender 131 to be associated with the identification test equipment 120 through the switch 131*a* and also associates this sender with the common identifier circuit 130. Thereafter, a rotary switch in the unit 120 is stepped to apply a test signal representing a known subscriber designation to the identification matrix 128 and to establish marking conditions in the test equipment 120 representing the known designation. In response to the application of the test signal, the identification matrix 128 provides the selective energization of four busses extending to the common identifier circuit 130 in accordance with the test signal, and the identifier circuit 130 in turn operates the seized identifier sender 131 to establish a registration of the values of the digits represented by the signals supplied from the identification matrix 128 to the identifier circuit 130**.

The identifier sender allotter 129 next releases the identification matrix 128 and the identifier circuit 130, and the seized one of the identifier senders 131 or 132 transmits four groups of mark pulses separated by space pulses to the identification test equipment 120. These mark and space pulses are registered on separate switches in the identification test equipment 120 and this registration is compared with the marking conditions previously established therein representing the known designation. In the event that the registered digits provided by the seized identifier sender 131 do not correspond with the known designation previously established in the identification test equipment 120, an alarm indication is provided and further operation of the testing equipment is terminated.

If the subscriber designation determined by the subscriber identifying means corresponds exactly with the known designation established in the test equipment 120, this test equipment proceeds to transmit additional test signals to the identification matrix 128 to selectively energize the identifier circuit 130 and additional seized identifier senders to transmit additional groups of mark pulses. These additional groups of mark pulses provide additional registrations which are also compared with the known designation to provide a check on the operation of the subscriber identifying means. The test signals supplied from the test equipment 120 to the identification matrix 128 are so chosen that each of the digit amplifying and detecting channels in the identifier circuit 130 are selectively energized and checked during the cycle of operation of the identification test equipment 120. In addition, the identification test equipment 120 includes means for providing a special indication in the event that the seized identifier sender does not receive any digital information from the common identifier circuit 130.

To provide means for checking on the adequacy of the connection between the circuit or switch means individual to the substation and the identification matrix 128, either prior to cutover or after the system has been modified, as by a reassignment of directory numbers, the identification test equipment 120 includes a manually applied testing lead which is used to selectively supply a test signal to the identification conductor or the multiple of the line circuit of any substation to be tested. A plurality of selector switches, which are manually set into positions corresponding to the designation of the substation to be tested, establish a registration in the test equipment 120 of this information. The test equipment then operates the identifier sender allotter 129 to associate one of the identifier senders with both the identifier circuit 130 and the identification test equipment 120. The identification potential or test signal applied through the test lead to the line circuit of the substation to be checked is returned over the identification conductor, similar to the conductor **140*a*, and through the identification matrix 128 to the identifier circuit 130, thereby to register the identified digits in the seized identifier sender. The seized identifier sender then transmits this digital information to the identification test equipment 120** wherein it is compared with the designation established by the selector switches. If the identified designation compares with the known designation, the testing or maintenance personnel is informed that the interconnection between the telephone equipment and the subscriber identifying means is correct. On the other hand, if the identified designation does not exactly correspond with the digits set on the selector switches, an alarm and a lamp display are provided which indicate either that the subscriber's line circuit is incorrectly interconnected with the subscriber identifying means or that some portion of the identifying means is operating improperly.

Accordingly, the identification test equipment 120 of the present invention provides means for automatically routining the plurality of signal amplifying, detecting, registering, and pulsing channels provided in the identification matrix, the identifier circuit, and the identifier senders 131 and 132 at selected intervals of time, thereby to determine the operating condition thereof. Since these tests are completely automatically performed without requiring manual intervention of any sort, it is possible to maintain a regular daily or more frequent check on the operation of the subscriber identifying means without providing an additional item of maintenance labor cost. This automatic routining aids in preventing a loss of revenue to the operating company by insuring that the subscriber identifying means are functioning properly to permit the toll calls to be assessed to the proper calling party. In addition the identification test equipment 120 can be manually operated to check the adequacy of the interconnections between existing telephone facilities and automatic subscriber identifying means which are added when the system is converted to automatic toll ticketing operation. This particular use of the test equipment 120 is not only desirable prior to a cutover of the system but is also of value when additional lines are added to the toll ticketing network or when changes are made in the strapping between the telephone system and the subscriber identifying means due to subscriber number changes.

Referring now more specifically to Figs. 2 to 8, inclusive, of the drawings, therein is disclosed a circuit diagram of the identification test equipment 120. To initiate a routining operation of this test equipment in which the operation of each of the amplifying and detecting channels of the identifier circuit 130 and of the registering and pulsing components of a seized identifier sender, such as the units 131 or 132, is checked, the clock and calendar circuit 133 applies start ground to a lead 291 which extends to the upper operating winding of a routine relay 340. The clock and calendar circuit 133, as disclosed in the above identified copending Morris et al. application, includes register switches providing a continuous indication of instant time, and, accordingly, a momentary ground pulse can be applied to the conductor 291 at any selected time during the day but preferably will be at a time at which the system traffic is low. The ground impulse applied to the conductor 291 operates the routine relay 340 to close a plurality of contacts 341, 344, 346, 347, 348, **341*a*, 344*a*, 346*a*, and 347*a* and to open a plurality of contacts 342, 343, 345, 349, 342*a*, 343*a*, 345*a*, and 348*a*. The closure of the contacts 347 completes a holding circuit for the lower operating winding of the routine relay 340 which extends to a pair of normally closed and grounded contacts 401**.

The opening of the contacts 342 and 343 interrupts a path extending from a pair of closed and grounded contacts 351 through the contacts 342, a pair of interrupter contacts 601 controlled by a motor magnet 600 of a rotary program switch, a wiper 604 controlled by this rotary switch and any one of the plurality of contacts in a contact bank 605 adapted to be engaged by the wiper 604 in the second to twentieth position of the rotary switch, and the contacts 343 to grounded battery through the operating winding of the relay 600. This circuit serves to return the rotary switch controlled by the motor magnet 600 to its normal position in which the wipers controlled thereby are in their home position, as shown in Figs. 6, 7, and 8 of the drawings. The opening of the contacts 345 interrupts, at an additional point, an operating circuit for a buzzer 420. The opening of the contacts **343*a* interrupts a partially prepared circuit for applying a sixty cycle identification potential or test signal to a test clip 290, and the concurrent closure of the contacts 344*a*** prepares a circuit for extending the identification potential to the rotary program switch.

The closure of the contacts 348, **341*a*, 346*a*, and 347*a* prepares operating circuits for a thousands-hundreds check relay 510 and a tens-units check relay 520 by interconnecting the two operating windings of each of these relays with circuits controlled by the automatic routining equipment in the test circuit 120. The concurrent opening of the contacts 349, 342*a*, 345*a*, and 348*a* interrupts the normally established circuits between the check relays 510 and 520 and circuits in the test equipment 120 which form a part of the manual test facilities, thereby conditioning the test equipment 120** for a routining operation by disabling those features of the circuit which are adapted for use in conjunction with the manually controlled testing of the subscriber identification means.

The closure of the contacts 341 and 344 completes an operating circuit for the motor magnet 600 of the rotary switch thereby to initiate the routining operation of the test equipment 120. This operating circuit extends from the closed and grounded contacts 341 through the interrupter contacts 601 of the motor magnet 600, a wiper 604 of the rotary program switch, the home position contact in the bank of contacts 605, the closed contacts 344, and thence to grounded battery through the operating winding of the motor magnet 600. A condenser 470 and a series resistor 471 provide contact protection for the switching components controlling the motor magnet 600. The completion of this circuit operates the motor magnet 600 to condition a plurality of wipers 602, 604, 606, 608, 710, and 890 for movement into engagement with the contacts forming the first stepping position of a plurality of contact banks 603, 605, 607, 609, 711, and 891, respectively, associated therewith. Operation of the motor magnet 600 also opens the interrupter contacts 601 to interrupt the above described operating circuit for the motor magnet 600 so that this magnet releases to advance the wipers 602, 604, 606, 608, 710, and 890 into engagement with the contacts forming the first stepping position. The movement of the wiper 890 into engagement with the first contact associated therewith establishes a marking condition in the test circuit 120 representing a thousands digit having a value of "1." In a similar manner, the wipers 606, 608, and 710, when moved to their first stepping position, establish marking conditions in the test circuit 120 representing units, tens, and hundreds digits having a value of "1" so that, in the first stepping position of the rotary program switch, a manifestation or registration is established representing a subscriber designation "1111."

Movement of the wiper 604 interrupts the above described operating circuit for the motor magnet 600, and movement of the wiper 602 to its first stepping position prepares a circuit for applying a test signal to the identification matrix 128 representing the subscriber designation "1111."

Referring back to the preceding operation of the routine relay 340, the closure of the contacts 346 completes an obvious operating circuit for a check relay 440. The operation of this relay closes a plurality of contacts 441, 442, 444, 445, and 446 and opens a pair of contacts 443. The opening of the contacts 443 disconnects a slow-to-release timing circuit including a series resistor 482 and a condenser 481 from the operating winding of a display relay 330, and the concurrent closure of the contact 441 connects resistance battery to the timing network through a series resistor 483 to insure the discharge of the condenser 481. The closure of the contacts 442 prepares an operating circuit for the display relay 330 extending to a pair of open contacts 331. The closure of the contacts 444 prepares an operating circuit for a reset relay 350 extending to a pair of open contacts 261 on a reset key 260. The closure of the contacts 445 prepares a circuit for extending ground to the wipers of a plurality of digit registering switches forming a portion of the subscriber designation checking circuit in the test equipment 120.

The closure of the contacts 446 completes an operating circuit for an identification start relay 360. This circuit extends from a pair of closed and grounded contacts 403 through the closed contacts 446 and a plurality of normally closed contacts 334, 353, 432, and 308 to the operating winding of the identification start relay 360. The operation of this relay closes a plurality of contacts 361, 362, and 363. The closure of the contacts 363 provides holding ground for the identification relay extending through the closed contacts 334, 353, 432, and 308.

The operation of the identification start relay 360 places the identifier sender allotter 129 in operation to associate an idle identifier sender with the identification test equipment 120 and with the common identifier circuit 130 and further marks the identification test circuit equipment 120 in the contact banks of the trunk finder switches, such as the switches **131*a* and 132*a*, so that the idle identifier sender associated with the identifier sender allotter 129 seizes the test equipment 120. More specifically, the closure of the contacts 361 applies ground to one of the bare wire multiples of the trunk finder switches 131*a* and 132*a*, thereby to mark the position of the identification test equipment 120 in the contact banks of the finder switches associated with the identifier senders 131 and 132. The identification test equipment 120 may be assigned to any particular position in the contact banks of the finder switches 131a and 132a which is not assigned to one of the trunk circuits 126 or 135 and, for instance, may be assigned the "09" position. In this position, the identification test equipment 120** is seized by moving the wipers of the finder switches ten steps to the "0" position in an X direction and by moving nine steps to the "9" position in the Y direction.

The closure of the contacts 362 applies start ground to a common identifier sender allotter start conductor 396 so that ground is forwarded to the identifier sender allotter 129 to place this circuit component in operation to assign an idle one of the identifier senders 131 or 132 to the common identifier circuit 130 and to the identification test equipment 120. The operation of the identifier sender allotter 129 in performing these functions is described in detail in the above identified copending Morris et al. application. As set forth therein, in response to the application of start ground, the identifier sender allotter 129 associates a preselected idle identifier sender, such as the identifier sender 131, with the calling circuit component by causing the trunk finder switch 131a individual to the identifier sender 131 to search for the marked X or XX and Y multiples. The operation of the trunk finder switch 131a in an X direction is terminated by the marking ground on the start conductor 396 which is forwarded to the X and XX terminals of the trunk finder switches 131a and 132a. The trunk finder switch 131a then moves in a Y direction to search for the wire multiple marked by the ground supplied by the closed contacts 361. When the designated wiper of the trunk finder switch 131a moves into engagement with the bare wire multiple connected to ground through the closed contacts 361, further operation of the trunk finder switch 131a is terminated, thereby completing the association of the identifier sender 131 with the identification test equipment 120.

In response to the completion of the association of the identifier sender 131 with the identification test equipment 120, the ground forwarded from the closed contacts 361 causes the identifier sender allotter 129 to operate a cut-through relay and a switch relay in the identifier sender 131. The operation of this relay, as described in the above identified copending Harris application interconnects forty register relays in the seized identifier sender 131 with the forty common output conductors extending from the common identifier circuit 131 through a cable 296, these forty conductors comprising ten conductors representing the digits 1 to 9 and 0 in each of the thousands, hundreds, tens, and units denominational groups of a subscriber designation. The operation of the cut-through relay in the seized identifier sender thus completes the association of the identifier sender 131 with both the identification equipment 120 and the common subscriber identification means including the matrix 128 and the identifier circuit 130. In order to advise the maintenance personnel of the identity of the identifier sender associated with the equipment 120 and with the identifier circuit 130, the operation of the cut-through relay in the identifier sender 131 applies ground to a conductor 281 to prepare an operating circuit for a sender one relay 530 in the identification equipment 120.

The operation of the cut-through relay in the seized identifier sender 131 also applies ground to the wiper which is in engagement with the bare wire multiple which is connected to the operating winding of a sender relay 300 through a pair of normally closed contacts 302. The application of ground to this bare wire multiple completes an obvious operating circuit for the sender relay 300 so that this relay operates to close a plurality of contacts 301, 303, 304, 305, and 306 and to open a plurality of contacts 302, 307, and 308. The contacts 301 and 302 form a make-before-break contact arrangement so that the closure of the contacts 301 prior to the opening of the contacts 302 to interrupt the operating circuit for the sender relay 300 completes a holding circuit therefor extending to the closed and ground contacts 361.

To prepare the test equipment 120 for receiving pulse information from the seized sender 131, the closure of the contacts 304 interconnects the wiper of the trunk finder switch 131a which is supplied with mark pulses by the identifier sender 131 with a wiper 451 of a space pulse register switch through a common contact forming a portion of an associated contact bank 452. The closure of the contacts 305 interconnects a motor magnet 450 of the space pulse register switch with the bare wire multiple and wiper of the trunk finder switch 131a which is supplied with space pulses by the seized identifier sender 131. The opening of the contacts 307 interrupts a portion of a circuit for supplying operating ground to the designation checking circuit in the test equipment 120 and to visible display means therein.

The opening of the contacts 308 interrupts the above described operating and holding circuit for the identification start relay 360 so that this relay releases to open the plurality of contacts 361, 362, and 363. The opening of the contacts 363 removes one source of holding ground for the identification start relay 360, and the opening of the contacts 362 removes start ground from the identifier sender allotter 129 so that the identifier sender allotter 129 is partially restored to normal. The opening of the contacts 361 removes marking ground from the bare wire multiples associated with the trunk finder switches 131a and 132a, thereby to prevent the seizure of the test equipment 120 in the event that the identifier sender allotter 129 is provided with start ground from the toll ticketing system in the interval that the test equipment 120 is being utilized. The opening of the contacts 361 also removes the source of holding ground for the sender relay 300. However, the seized identifier sender 131 in operating the switch relay therein, as described above, provides a resistance ground on the wiper which is connected to the operating winding of the sender relay 300 through the closed contacts 301. This resistance ground, as described in the above identified copending Harris application, is sufficient to maintain the sender relay 300 operated but is not sufficient to stop an additional trunk finder switch on the bare wire multiples individual to the test equipment 120. Accordingly, the sender relay 300 is not released in response to the release of the identification start relay 360.

The closure of the contacts 306, in response to operation of the sender relay 300, completes an obvious operating circuit for a display relay 330 which, in operating, closes a plurality of contacts 331, 332, and 335 and opens a plurality of contacts 333 and 334. The closure of the contacts 331 completes a holding circuit for the display relay 330 extending to the closed and grounded contacts 341 through the interrupter contacts 601 and the closed contacts 442. The opening of the contacts 333 removes ground from a common operating circuit for a plurality of reset magnets forming a part of the digit register switches. The concurrent closure of the contacts 332 prepares a portion of a path, now interrupted at the open contacts 307, for applying operating ground to lamp display means associated with the digit register switches and to the check circuit in the identification test equipment 120. The opening of the contacts 334 interrupts, at an additional point, the operating and holding circuit for the identification start relay 360. The closure of the contacts 335 provides holding ground for the sender one relay 530, a sender two relay 540, and a no-identification relay 500.

Referring back to the preceding operation of the sender relay 300, the closure of the contacts 303 also extends the ground provided in the seized identifier sender 131 to the operating winding of an identify relay 320 so that this relay operates to close a plurality of contacts 321, 322, 323, 324, 325, and 326. The closure of the contacts 321 applies ground through one of the wipers of the trunk finder switch 131*a* to the identifier sender 131 and thence to the identifier sender allotter 129, thereby to maintain certain components of the identifier sender allotter 129 operated even though start ground has been removed from the conductor 396 by the opening of the contacts 362. Since the identification start relay 360 is released substantially simultaneously with the operation of the identify relay 320, the opening of the contacts 361 and 362 and the closing of the contacts 321 occur substantially simultaneously to hold a portion of the identifier sender allotter 129 operated. The portion of the identifier sender allotter 129 which is maintained operated holds the cut-through and switch relays in the seized identifier sender 131 operated so that ground is maintained on the operating winding of the identify relay 320.

The closure of the contacts 326 prepares an operating circuit for a no-identification relay 500 in the test equipment 120 which extends to a conductor 283 which is common to both of the identifier senders 131 and 132, this conductor being provided with a time delayed ground in the identifier senders 131 or 132 in the event that these circuit components do not receive any digital information from the common identifier circuit 130.

The closure of the contacts 324 and 325 completes the preparation of the operating circuits for the pair of sender identifying relays including the sender one relay 530 and the sender two relay 540. As described above, the identifier sender 131 provides ground on the conductor 281 to indicate that the sender 131 has been associated with the identification test equipment 120. Therefore, the closure of the contacts 324 completes an obvious operating circuit for the sender one relay so that this relay operates to close a plurality of contacts 531 and 532. The closure of the contacts 531 completes a holding circuit for the relay 530 extending to the closed contacts 335. The closure of the contacts 532 completes an obvious energizing circuit for a signaling lamp 570, thereby to provide a visible indication that the first identifier sender 131 has been associated with the identification test equipment 120. If the sender 132 had been seized, the closure of the contacts 325 extends the ground on a conductor 282 individual to the sender 132 to operate the sender two relay 540. Operation of this relay closes a plurality of contacts 541 and 542 to illuminate a lamp 560 as an indication that the sender 132 had been seized.

The closure of the contacts 323 completes an obvious energizing circuit for a peg count register 310, thereby to provide a cumulative record of the number of times that a routining operation has been performed by the equipment 120.

Figure 2:
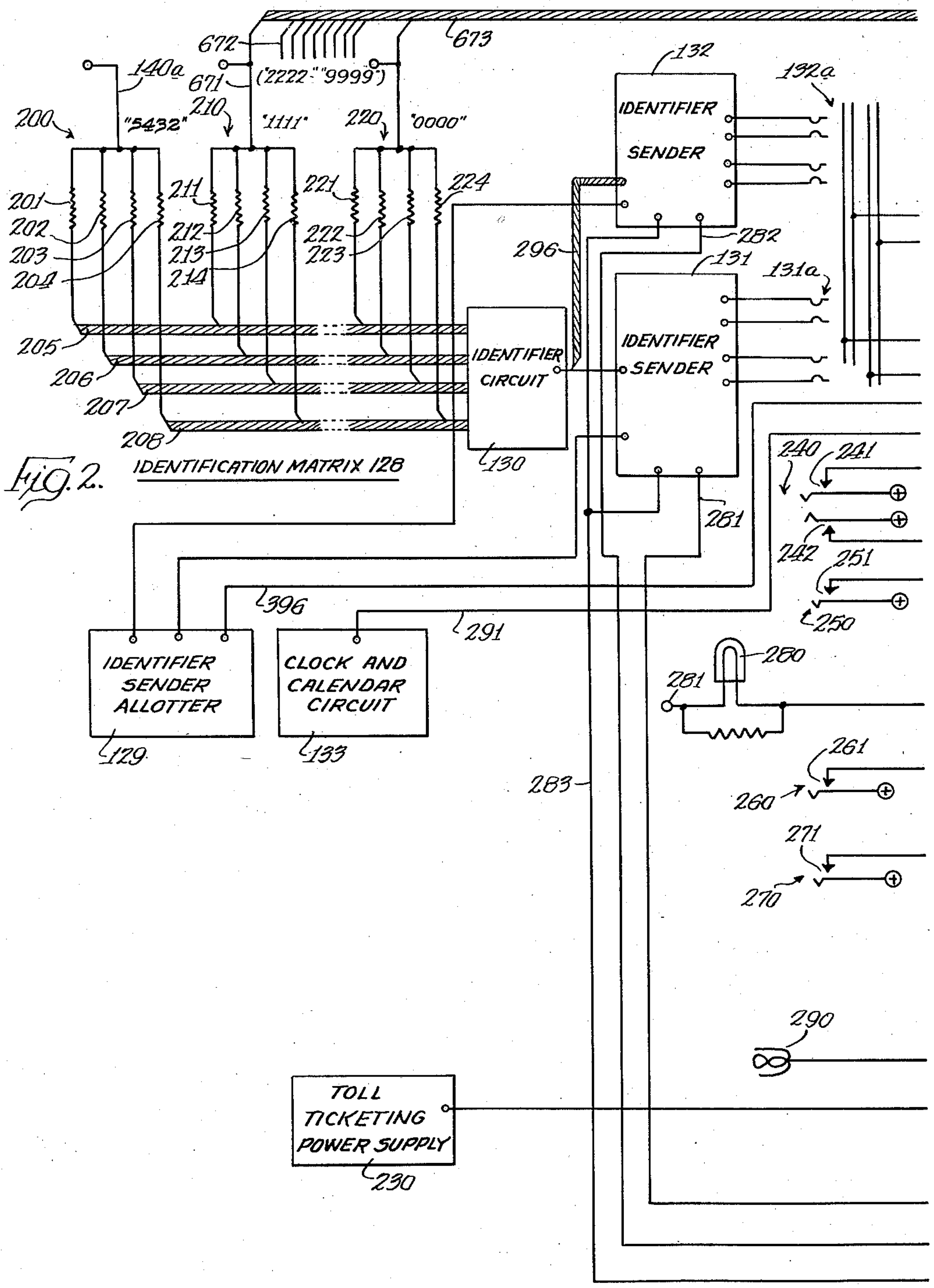
Figure 3:
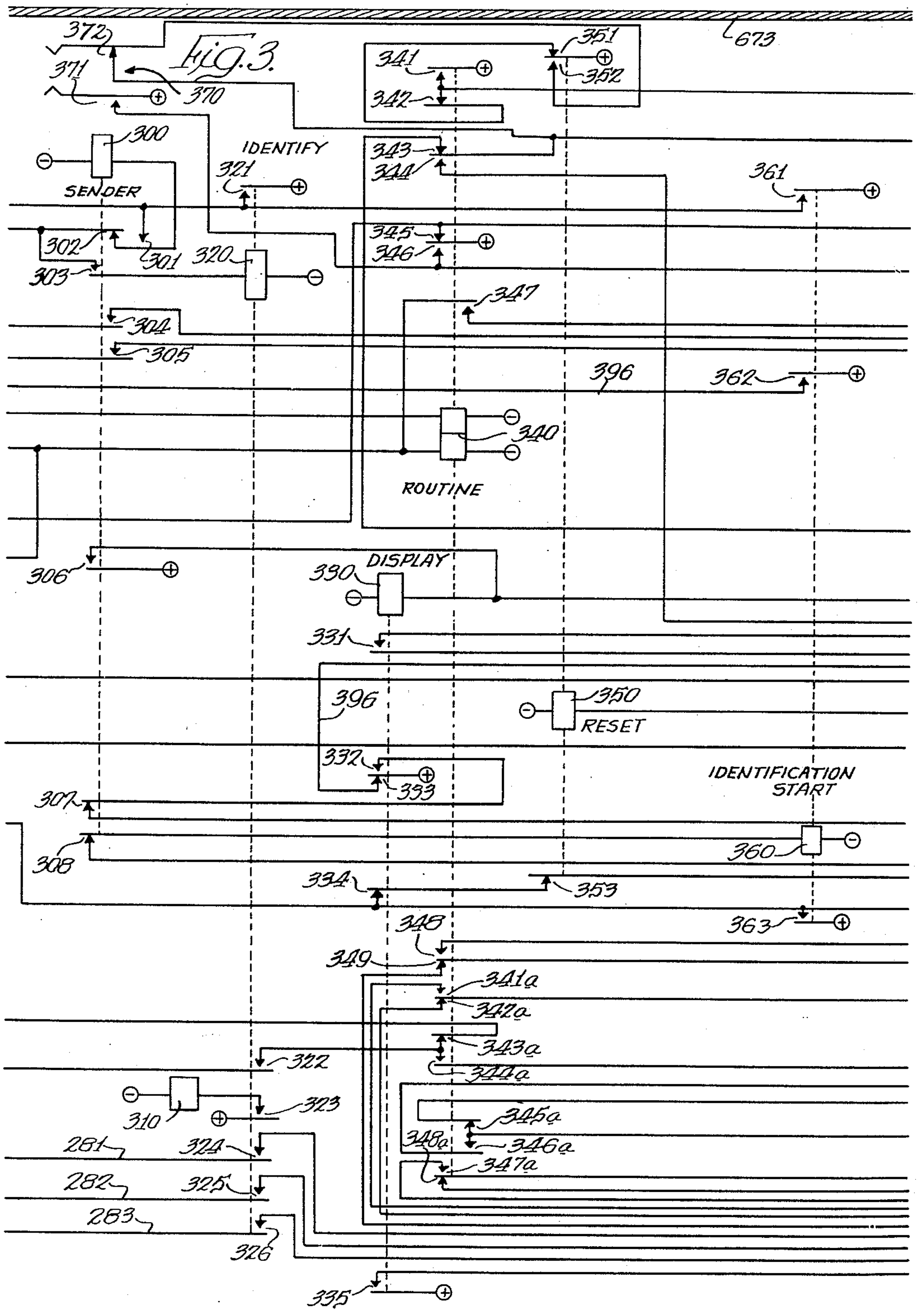
Figure 4:
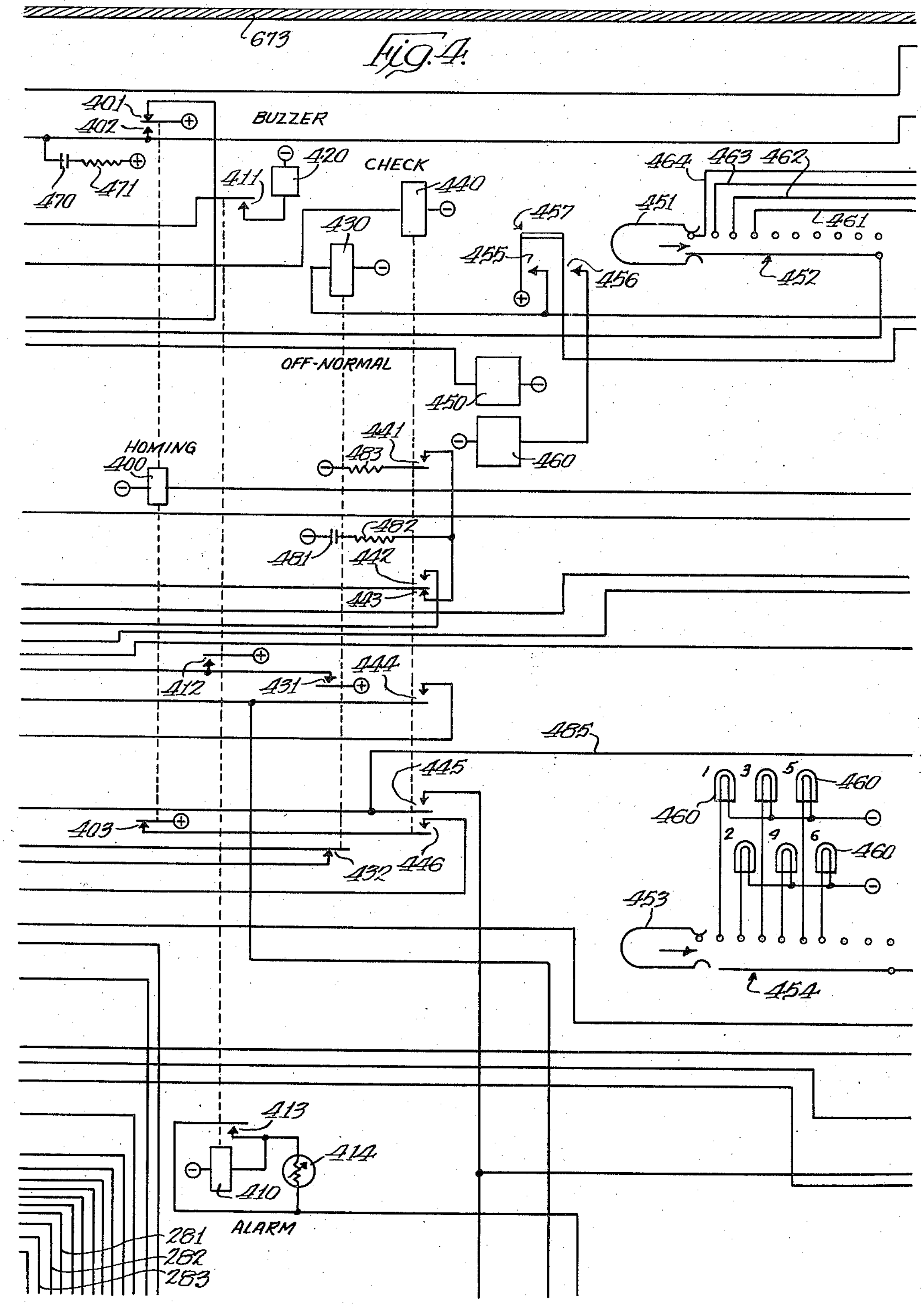
Figure 5:
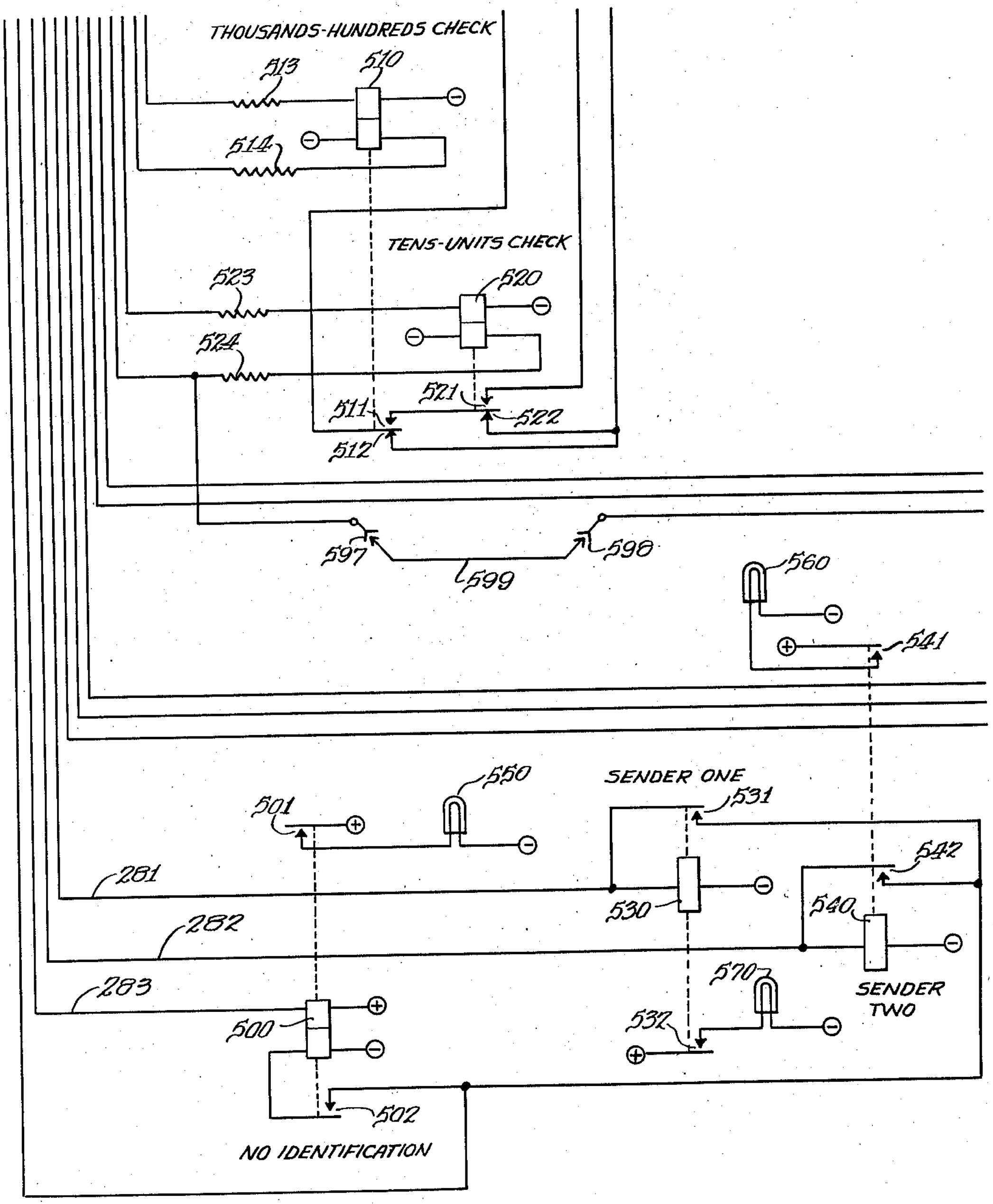

The closure of the contacts 322 completes a circuit for applying a test signal from a toll ticketing power supply 230 through the identification test equipment 120 to a matrix terminal in the identification matrix 128 corresponding to the known designation established in the test equipment 120 by the above described operation of the rotary program switch, i. e. the designation "1111." More specifically, closure of the contacts 322 completes a circuit extending from the toll ticketing power supply 230 through the closed contacts 322, and 344*a* to the wiper 602 of the rotary program switch. This wiper, as described above, is in engagement with the contact in the bank 603 forming the first stepping position thereof. This contact is connected to a conductor 671 which extends through a cable 673 to the identification matrix 128. As shown in Fig. 2 of the drawings, the conductor 671 is connected to a four element resistance cluster 210 including four resistance elements 211, 212, 213, and 214. These four resistance elements are connected to a "1" representing bus in a thousands digit cable 205, a "1" representing bus in a hundreds digit cable 206, a "1" representing bus in a tens digit cable 207, and a "1" representing bus in a units digit cable 208. Accordingly, the closure of the contacts 322 applies a sixty cycle identification potential or test signal from the toll ticketing power supply 230 through the rotary program switch to a selected four element cluster in the identification matrix 128 to selectively energize four digit manifesting conductors extending to the input of the identifier circuit 120 in accordance with the known designation, i. e. "1111" established in the identification test equipment 120. These four selectively energized busses energize the corresponding amplifying and detecting channels in the common identifier circuit 130 so that the "1" representing register relays in the seized identifier sender 131 are operated by the output signal provided on the conductors in the output cable 296.

In response to the selective operation of these four relays and their associated relays in the register sender 131, a relay is operated which opens the path grounded by the preceding closure of the contacts 321 for maintaining a portion of the identifier sender allotter 129 operated. In response to the release of this remaining portion of the allotter 129, the cut-through relay in the seized identifier sender 131 is released to open the connection between this identifier sender and the common identifier circuit 130. In addition, the release of this relay removes direct ground from the wiper which is connected to the operating winding of the identify relay 320 so that this relay releases to open the contacts 321, 322, 323, 324, 325, and 326.

The opening of the contacts 321 removes the above described source of holding ground for the identifier sender allotter 129, but the opening of these contacts does not release the sender relay 300 inasmuch as this relay is maintained operated by the resistance ground extended through the closed contacts 301 from the identifier sender 131. The opening of the contacts 322 removes the source of alternating current potential provided through the cable 673 and the conductor 671 to the "1111" representing manifesting resistance cluster 210 in the identification matrix 128 and, accordingly, terminates the selective energization of the identifier circuit 130.

The opening of the contacts 323 opens the operating circuit for the peg count register 310. The opening of the contacts 324 and 325 releases the above described operating circuits for the sender relays 530 and 540, but the relay 530 is maintained operated by the holding circuit extending through the closed contacts 531 to ground at the closed contacts 335. The opening of the contacts 326 interrupts the above described operating circuit for the no-identification relay 500.

The completion of the release of the identifier sender allotter 129 together with the release of the cut-through relay in the identifier sender 131 conditions this component for transmitting four groups of mark pulses separated by space pulses to the identification test equipment 120 under the control of the items of information previously registered therein in response to the selective energization of the resistance cluster 210. More specifically, the register relays in the identifier sender 131 provide a plurality of ground pulses on the mark wiper of the trunk finder switch 131*a* which, as described above, is connected to the wiper 451 and the common contact in the contact bank 452 of the space pulse register switch. These ground pulses are extended through a conductor 464, which is connected to the first contact of the space pulse register switch, to the operating winding of a motor magnet 800 of a thousands digit register switch.

If the subscriber identifying means operate correctly, the selective energization of the resistance element 211 will result in the application of a single mark pulse from the identifier sender 131 to the motor magnet 800. In operating and releasing in response to the transmission of this single pulse, the motor magnet 800 steps a pair of wipers 804 and 806 a single step over the contacts in the contact banks 805 and 807 associated therewith so that the wipers 804 and 806 engage the first contacts.

The wiper 804, in advancing to its first stepping position, provides an indication that the valve of the thousands digit identified by the automatically operated toll ticketing equipment is "1." The wiper 806, in advancing, prepares an energizing path for a "1" manifesting display lamp 850.

In addition, the first step of movement of the wipers 804 and 806 operates an off-normal switch arrangement 801 to close a plurality of contacts 802 and 803. The closure of the contacts 803 prepares an operating circuit for a reset magnet 815 of the thousands digit register switch. The closure of the contacts 802 extends ground to the operating winding of an off-normal relay 430, thereby operating this relay to close a pair of contacts 431 and to open the pair of contacts 432. The opening of the contacts 432 interrupts an additional point in the operating circuit for the identification start relay 360, and the closure of the contacts 431 applies ground to one side of an alarm lamp 280. The other side of this lamp is connected by a terminal 281 to a time delayed source of grounded battery so that, if the contacts 431 are maintained closed longer than a preselected interval, a visible indication is provided of the off-normal condition of the thousands digit register switch in the identification test equipment 120.

Again assuming that the common subscriber identifying means in the toll ticketing system operate correctly, a space pulse is transmitted by the seized identifier sender 131 immediately following the single mark pulse transmitted to the motor magnet 800 of the thousands digit register switch. This single space pulse is transmitted through the closed contacts 305 to the motor magnet 450 of the space pulse register switch. This ground pulse operates and releases the motor magnet 450 so that a pair of wipers 451 and 453 controlled thereby are moved into engagement with the second contacts in a pair of contact banks 452 and 454 associated therewith. In addition, in moving this single step, the wipers operate an off-normal contact arrangement 457 to close a plurality of contacts 455 and 456. The closure of the contacts 456 prepares an operating circuit for a reset magnet 460, and the closure of the contacts 455 provides an additional source of operating and holding ground for the now operated off-normal relay 430.

In moving to the contacts in the bank 454 forming the first stepping position of the space pulse register switch, the wiper 453 prepares an energizing path for a "1" manifesting indicating lamp 460, thereby to indicate that a single space pulse has been received from the seized identifier sender 131 by the identification test equipment 120. In moving from its home position to its first stepping position, the wiper 451 interrupts the above described path extending from the mark pulse lead to the conductor 464, which is connected to the motor magnet 800 of the thousands digit register switch, and prepares a circuit extending over a conductor 463 to a motor magnet 720 of a hundreds digit register switch.

Accordingly, in response to the transmission of the group of mark pulses representing the value of the thousands digit of the identified subscriber designation, the thousands digit register switch is advanced to a position corresponding to the number of mark pulses transmitted thereto so that the wiper 804 forming a part of an automatic digit checking circuit in the equipment 120 is moved to a position representing the value of the transmitted thousands digit and so that the wiper 806 is moved into a position conditioning a display lamp for illumination to manifest the value of this transmitted digit. The single space pulse transmitted following the group of mark pulses representing the value of the thousands digit operates the space pulse register switch so that the wiper 453 thereof is advanced to a position conditioning a "1" space pulse manifesting lamp for illumination and so that the wiper 451 is advanced to disable the pulsing circuit for the thousands digit register switch and to prepare a pulsing circuit for the hundreds digit register switch.

The seized identifier sender 131 now transmits the group of mark pulses representing the value of the hundreds digit of the designation identified by the automatic subscriber identifying equipment which, in the example set forth above, includes only a single mark pulse. The application of this single ground pulse over the conductor 463 to the motor magnet 730 of the hundreds digit register switch advances a pair of wipers 724 and 726 through a single step so that the wiper 724 engages the first contact in a contact bank 725 forming a portion of the automatic digit checking circuit. The wiper 726 engages a contact in a contact bank 727 to condition a "1" manifesting lamp 740 for illumination to indicate the value of the identified hundreds digit. In addition, in advancing the single step, the wipers 724 and 726 operate an off-normal contact arrangement 721 so that a pair of off-normal contacts 722 and 723 are closed. The closure of the contacts 723 prepares an operating path for a reset magnet 735 forming a portion of the hundreds digit register switch. The closure of the contacts 722 provides an additional source of holding and operating ground for the off-normal relay 430.

The transmission of the single space pulse following the group of mark pulses representing the value of the hundreds identified digit operates and releases the motor magnet 450 of the space pulse register switch so that the wipers 451 and 453 are moved to their second stepping position. Movement of the wiper 453 into its second position interrupts the previously prepared circuit for the "1" manifesting lamp 460 and prepares an energizing circuit for a "2" manifesting lamp 460. The advancement of the wiper 451 interrupts the above described circuit extending through the wiper 451 to the conductor 463 for pulsing the motor magnet 720 of the hundreds digit register switch and prepares a pulsing path extending over a conductor 462 to a motor magnet 650 of a tens digit register switch.

In the example assumed above, the value of the tens digit of the known designation is "1" and, accordingly, if the automatic calling line identifying equipment is operating properly, a single mark pulse is transmitted from the seized identifier sender 131 over the conductor 462 to the motor magnet 650, thereby advancing the tens digit register switch a single step so that a pair of wipers 654 and 790 are moved into engagement with the first contacts in the banks 655 and 791 associated therewith. The wiper 654 and the contact bank 655 form a portion of the automatic digit checking circuit, and the wiper 790 together with the contact bank 791 prepare an energizing circuit for a "1" manifesting lamp 793. In moving from its normal position, the tens digit register switch operates an off-normal contact arrangement 651 to close a plurality of contacts 652 and 653. The closure of the contacts 653 prepares an operating path for a reset magnet 660 and the closure of the contacts 652 provides an additional source of holding ground for the off-normal relay 430.

The single space pulse following the group of mark pulses representing the value of the identified tens digit operates and releases the motor magnet 450 so that the wipers 451 and 453 are advanced a single step. In moving this step, the wiper 453 prepares an energizing path for a "3" manifesting indicator lamp 460, and the wiper 451 interrupts the above described circuit extending over the conductor 462 to the motor magnet 650 of the tens digit register switch and prepares a path extending over a conductor 461 to a motor magnet 620 of a units digit register switch.

Since the "1" manifesting resistor 214 in the cluster 210 was energized over the conductor 671 by the identification test circuit 120, only a single pulse should be transmitted by the identifier sender 131 to form the group of mark pulses representing the value of the identified units digit. If these circuit components are operating properly, a single ground pulse is transmitted to operate and release the motor magnet 620, thereby to advance a pair of wipers 624 and 626 a single step in a pair of contact banks 625 and 627 associated therewith. The wiper 624 and the contact bank 625 form a portion of the automatic digit checking circuit, and the wiper 626, in moving to the first position, prepares an energizing circuit for a "1" manifesting lamp 673, thereby to provide a visible indication of the value of the identified units digit of the subscriber designation. In addition, the units digit register switch includes an off-normal contact arrangement 621 which is operated in response to the first advance of this switch to close a plurality of contacts 622 and 623. The closure of the contacts 622 provides an additional source of holding ground for the off-normal relay 430, and the closure of the contacts 623 prepares an operating circuit for a reset magnet 630, also forming a part of the units digit register switch.

The single space pulse transmitted from the seized identifier sender 131 following the transmission of the group of mark pulses representing the value of the identified units digit operates and releases the motor magnet 450 so that the wipers 451 and 453 are again advanced a single step. In this position, the wiper 453 prepares an energizing circuit for a "4" manifesting lamp 460, and the wiper 451 interrupts the circuit including the conductor 461 for applying mark pulses to the motor magnet 620 of the units digit register switch.

Accordingly, at this time, each of the thousands, hundreds, tens, and units digit register switches in the identification test equipment 120 has been advanced to a position representing the value of the corresponding digit of the subscriber designation or directory number transmitted by the seized identifier sender 131. The space pulse register switch is conditioned to provide a visible indication of the number of transmitted space pulses, and the thousands, hundreds, tens, and units digit register switches are conditioned to provide a visible display of the digits of the identified subscriber designation in addition to providing a registration of these digits in the digit checking circuit of the equipment 120.

Following the completion of the transmission of the mark and space pulse information representing the identified directory number, and, as described in the above identified copending Harris application, the identifier sender 131 releases to remove holding ground from the wiper which is connected to the operating winding of the sender relay 300 through the closed contacts 301. The release of the sender relay 300 closes the contacts 302, 307, and 308 and opens the contacts 301, 303, 304, 305, and 306. The opening of the contacts 301 together with the closure of the contacts 302 prepares the above described operating circuit for the sender relay 300. The opening of the contacts 303 interrupts the previously opened operating circuit for the identify relay 320. The opening of the contacts 304 and 305 opens the above described circuits for supplying mark and space pulses from the seized identifier sender to the identification test circuit 120. The opening of the contacts 306 interrupts the operating circuit for the display relay 330, but this relay remains operated over the above described holding circuit extending to the closed and grounded contacts 341. The closure of the contacts 308 prepares a portion of the above described operating circuit for the identificaiton start relay 360, but this circuit remains interrupted at the open contacts 334.

In order to provide a visible display of the digital information transmitted from the seized identifier sender 131 to the identification test circuit 120, the closure of the contacts 307 completes a circuit for energizing the circuits previously prepared by the plurality of wipers 626, 790, 726, 453, and 806 controlled by the plurality of register switches. More specifically, this energizing circuit extends from the closed and grounded contacts 332 through the closed contacts 307 to a common conductor 485 which extends to the common contact in each of the contact banks 627, 655, 454, 791, 727, and 807. Since the one side of the filament of each of the indicating lamps 460, 673, 793, 740, and 850 is connected to grounded battery, the ground applied to these wipers completes energizing circuits for the selected lamps to provide a visible indication of the digital information transmitted from the identifier sender 131. If the automatic subscriber identifying means has operated properly in response to the selective energization of the conductor 671 representing the designation "1111," the "1" manifesting lamps 673, 793, 740, and 850 are illuminated. Similarly, if four space pulses have been transmitted following each of the groups of digit representing mark pulses, the "4" manifesting lamp 460 is illuminated.

The identification test equipment 120 also includes the digit checking means for automatically advancing the rotary program switch to continue the routining operation only when the subscriber designation transmitted from the seized identifier sender 131 exactly corresponds with the known designation established in the test equipment 120 by the selective positions of the wipers 606, 608, 710, and 890. As described above, when the rotary program switch is advanced to its first position, the wiper 602 applies the identification potential or test signal to the conductors 671 to energize the resistance cluster 210 representing the designation "1111." Simultaneously therewith, the wipers 606, 608, 710, and 890 are moved into positions representing this designation, i. e. the wiper 606 representing the units digit, the wiper 608 representing the tens digit, the wiper 710 representing the hundreds digit, and the wiper 890 representing the thousands digit. These contacts in the first stepping position of the rotary program switch representing the designation "1111" are strapped to the correspondingly designated contacts in the contact banks 625, 655, 725, and 805 in the units, tens, hundreds, and thousands register switches, respectively. For example, the first contact in the bank 607 representing the units digit "1" is strapped to the first contact in the bank 625 which also represents the units digit "1." Each of the individual thousands, hundreds, tens, and units digit register switches cooperates with certain of the contact banks on the rotary program switch to provide individual digit checking paths for controlling the selective energization of the thousands-hundreds check relay 510 and the tens-units check relay 520.

More specifically, this check circuit is placed in operation by the above described closure of the contacts 307 in response to the release of the sender relay 300. In addition to applying ground to the common display conductor 485, the ground provided at the closed contacts 322 is extended through the closed contacts 445 to be applied to the common contact in each of the contact banks 625, 655, 725, and 805. Assuming that the identification test equipment 120 has received a correct identification from the seized identifier sender 131, as described above, the wiper 624 in the units rotary switch engages the first contact in the bank 625 so that the ground extended thereto is further extended through the wiper 624, the first contact in the bank 607, the wiper 606, the closed contacts 347*a* and through a series resistor 524 to the lower operating winding of the tens-units check relay 520. Although the lower operating winding of the relay 520 is energized by the completion of this circuit, the introduction of the series resistor 524 reduces the current flow therethrough to the point that the energization of this single winding is not sufficient to operate the springs on this relay. However, the selective energization of the lower operating winding of the relay 520 indicates that the value of the units digit identified by the subscriber identification equipment corresponds to the value of the units digit established in the test equipment 120.

To check the accuracy of the tens digit, the ground supplied to the common contact in the bank 655 is extended through the wiper 654, the strapping to the bank 609, the wiper 608, and thence through the closed contacts 346*a* and a series resistor 523 to the upper operating winding of the tens-units check relay 520. The energization of the upper operating winding of the tens-units check relay in conjunction with the above described energization of the lower operating winding thereof causes the operation of this relay to open a pair of contacts 522 and to close a pair of contacts 521. The opening of the contacts 522 interrupts a portion of an alarm circuit, thereby to indicate that the tens and units digits have been correctly identified. The closure of the contact 521 prepares a portion of an operating circuit for the reset relay 350.

The wiper 724 provides a means for checking the accuracy of the determination of the hundreds digit of the known designation inasmuch as the ground applied to the common contact of the bank 725 is extended through the wiper 724, the first contacts in the banks 711 and 725, the wiper 710, the closed contacts 341*a*, and a series resistor 514 to the lower operating winding of the thousands-hundreds check relay 510. The selective energization of the lower operating winding of the relay 510 is not sufficient to operate the springs controlled thereby due to the current reduction caused by the series resistor 514.

In order to check the accuracy of the determination of the thousands digit, the ground provided at the common contact in the bank 805 is extended through the wiper 804 to the contact which this wiper engages. Assuming that the "1" thousands digit has been correctly identified, this ground is further extended through the strapping between the banks 891 and 805 to the wiper 890 and thence to the upper operating winding of the relay 510 through a series resistor 513 and the closed contacts 348. The simultaneous energization of both the upper and lower operating winding of the relay 510 operates this relay to close a pair of contacts 511 and to open a pair of contacts 512. The opening of the contacts 512 indicates that the thousands and hundreds digits have properly been identified by the common subscriber identification equipment, and the closure of the contact 511 completes an operating path for the reset relay 350, this path extending through the contacts 521 from the closed and grounded contacts 332.

The operation of the reset relay 350 opens a plurality of contacts 351 and 353 and closes a pair of contacts 352. The opening of the contacts 351 interrupts, at an additional point, the above described homing circuit for the rotary program switch, and the opening of the contacts 353 interrupts, at an additional point, the above described operating and holding circuit for the identification start relay 360. The closure of the contacts 352 completes an operating circuit for the motor magnet 600 extending through a pair of normally closed contacts 372 on an identify check key 370 so that this magnet is operated to prepare the wipers controlled thereby for movement into engagement with contacts forming the second stepping position thereof. In addition, in operating, the motor magnet 600 opens the interrupter contact 601 so that the above described holding circuit for the display relay 330 is opened to permit this relay to release to open the contacts 331, 332, and 335 and to close the contacts 333 and 334. The opening of the contacts 331 interrupts, at an additional point, the above described holding circuit for the display relay 330. The opening of the contacts 335 removes the source of holding ground from the sender one relay 530 so that this relay releases to open the contacts 531 and 532. The opening of the contacts 531 interrupts, at an additional point, the holding circuit for this relay, and the opening of the contacts 532 terminates the illumination of the lamp 570. The closure of the contacts 334 prepares a point in the operating circuit for the identification start relay 360, but this circuit remains interrupted at the open contacts 353.

The opening of the contacts 332 removes the ground from the common display conductor 485 so that the selective illumination of the lamps indicating the values of the thousands, hundreds, tens, and units digits of the identified directory number and the number of space pulses transmitted is terminated. In addition, the opening of the contacts 332 removes the ground applied to the contact banks 625, 655, 725, and 805 so that the relays 510 and 520 are released.

The concurrent closure of the contacts 333 applies ground to a common reset conductor 396 which extends to the reset magnets of all of the rotary switches which are in an off-normal position as a result of the pulses transmitted from the seized identifier sender. More specifically, the ground provided on the common reset conductor 396 is extended through the closed contacts 803 to energize the reset magnet 815, through the closed contacts 723 to energize the reset magnet 735, through the closed contacts 653 to energize the magnet 660, through the closed contacts 623 to energize the reset magnet 630, and through the closed contacts 456 to energize the reset magnet 460. In this manner, in response to the operation of the reset relay 350 and the consequent release of the display relay 330, the thousands, hundreds, tens, and units register switches are restored to a normal position, and, further, the space pulse register switch is returned to its normal position. Incident to returning the wipers to their normal home positions in the thousands, hundreds, tens, and units register switches, the off-normal contact arrangements 621, 651, 721, and 801 are restored to a normal condition. Further, in restoring the space pulse register switch to a normal position, the off-normal contact arrangement 457 is restored to its normal position and the wiper 451 is returned to its normal home position in which the common contact in the bank 452, which is connected to the mark pulse multiple in the trunk finder switches, is connected to the conductor 464 to prepare a circuit for applying the next group of received mark pulses to the motor magnet 800 of the thousands digit register switch.

In restoring all of the off-normal switch arrangements 457, 621, 651, 721, and 801 to their normal positions, the plurality of contacts similar to the contacts 455 and 803 are opened to remove the operating and holding ground from the winding of the off-normal relay 430. This relay now releases to open the contacts 431 and to close the contacts 432. The opening of the contacts 431 removes ground from one side of the alarm lamp 280, thereby to indicate that the display and digit checking operations of the identification test equipment 120 has been completed within the allotted time. Accordingly, a visible alarm indication is not provided by the illumination of the lamp 280. The closure of the contacts 432 prepares an additional portion of the operating path for the identification start relay 360, which path remains interrupted at the open contacts 353. The provision of the off-normal relay 430 controlled by the off-normal contact arrangements of the plurality of register switches in the identification test equipment 120 aids in preventing an incorrect operation thereof in insuring that all of the register switches are returned to their normal home position following the completion of a cycle of operation.

As set forth above, the contacts 332 are opened in response to the release of the display relay 330 due to the operation of the reset relay 350. However, the opening of the contacts 332 removes operating ground from the winding of the reset relay 350 so that this relay releases to close the contacts 351 and 353 and to open the contacts 352. The closure of the contacts 351 prepares a portion of the homing circuit for the rotary program switch which is interrupted at the open contacts 342.

The opening of the contacts 352 interrupts the above described operating circuit for the motor magnet 600 of the rotary program switch so that the conditioned wipers 602, 604, 606, 608, 710, and 890 are advanced into engagement with the contacts forming the second stepping position thereof. In this second stepping position, the wipers 606, 608, 710, and 890 engage contacts in their associated contact banks which are strapped to the second contacts in the contact banks 625, 655, 725, and 805, thereby providing a registration of a subscriber designation "2222," which designation provides for the routining of the "2" representing channels in the identifier circuit 130 and in the identifier senders 131 and 132. Further, in this second stepping position, the wiper 602 is in engagement with a contact to which is connected a conductor 672. This conductor extends through the cable 673 to the identification matrix 128 and is connected therein to a four resistance element cluster which selectively energizes the "2" representing conductors in the thousands, hundreds, tens, and units digit cables 205, 206, 207, and 208 when the test signal is applied to the conductor 672. Accordingly, in its second position, the rotary program switch establishes marking conditions representing a second known designation, i. e. "2222" and further prepares a path for extending a test signal to the "2222" representing cluster in the identification matrix 128.

Referring back to the above described release of the reset relay 350, the closure of the contacts 353 completes the previously described circuit extending to the closed and grounded contacts 403 for operating the identification start relay 360. The operation of this relay again places the identifier sender allotter 129 in operation so that an idle one of the identifier senders 131 or 132 is associated with the identifier circuit 130 and the test equipment 120 by its associated trunk finder switch. In response to the completion of this operation, as indicated by the operation of the sender relay 300 and by the operation and release of the identify relay 320, the test signal is supplied from the toll ticketing power supply 230 through the wiper 602 and the conductor 672 to selectively energize the "2222" manifesting cluster in the identification matrix 128. Thereafter, the identifier circuit 130 and the seized identifier sender operate to provide four groups of mark pulses separated by space pulses which are transmitted to the identification test equipment 120 and which operate, as described above, to selectively operate the thousands, hundreds, tens, and units digit register switches to positions corresponding to the values of the digits represented by the transmitted mark pulses. Following the completion of the storage of this information, the seized identifier sender is released, and the above described display and digit checking operations take place.

In the event that the digit checking operation indicates that the thousands, hundreds, tens, and units digits of the known subscriber designation have been correctly identified by the common subscriber identification equipment in the toll ticketing system, the reset relay 350 is again operated to restore all of the rotary switches to their normal position and to advance the program rotary switch to its third stepping position. This operation continues until such time as the program rotary switch is moved to its tenth stepping position in which the wipers 606, 608, 710, and 890 are in a position representing the designation "0000" and in which the wiper 602 is in engagement with a contact to which is connected a conductor 674. This conductor extends through the cable 673 to a resistance cluster 220 including a plurality of individual resistance elements 221, 222, 223, and 224 which selectively energizes the "0" manifesting conductors in the thousands, hundreds, tens, and units cables 205, 206, 207, and 208.

Following the completion of the test of the identifying means for this designation, the rotary program switch is advanced to its eleventh stepping position under the control of the reset relay 350. In the eleventh to twentieth stepping position of the program switch, the routining operations described above are again repeated so that, during each cycle of operation of the test equipment 120, the different digit representing channels in the identifier circuit 130 and in the identifier senders are checked twice. Following the second satisfactory completion of the tests involving the designations "1111" to "0000," inclusive, the rotary program switch is advanced to move the wipers into engagement with the contacts forming the twenty-first stepping position. In this position, the wiper 604 is connected to the operating winding of a homing relay 400. The wiper 604 is provided with direct ground through the interrupter contacts 601 of the motor magnet 600 from the closed and grounded contacts 341, and this ground is extended through the wiper 604 to the operating winding of the homing relay 400 so that this relay operates to open a plurality of contacts 401 and 403 and to close a pair of contacts 402.

The opening of the contacts 403 opens the operating circuit for the identification start relay 360 so that this relay cannot be operated. The opening of the contacts 401 removes the ground applied through the closed contacts 347 to the lower operating winding of the routine relay 340, thereby to release this relay. The release of the routine relay aids in restoring the identification test equipment 120 to its normal condition. In addition, the release of the routine relay 340 opens the contacts 341 to remove the source of ground applied through the wiper 604 for operating the homing relay 400. However, the release of the routine relay 340 also closes the contacts 342 so that ground is forwarded from the closed and grounded contacts 351 through the interrupter contact 601 for application to the operating winding of the homing relay 400.

The closure of the contacts 402 completes an obvious operating circuit for the motor magnet 600 so that the wipers 602, 604, 606, 608, 710, and 890 are conditioned for movement into engagement with the contacts forming the twenty-second stepping position of the rotary program switch. When the motor magnet 600 operates to condition the above described wipers for movement into engagement with the contacts forming the twenty-second stepping position, the interrupter contacts 601 are opened to release the homing relay 400. The release of this relay, in opening the contacts 402, terminates the energization of the motor magnet 600 to permit the wipers to move into engagement with the contacts forming the twenty-second stepping position. The closure of the contacts 401 and 403 produces no useful function at this time.

In the twenty-second, twenty-third, twenty-fourth, and twenty-fifth stepping positions of the rotary program switch, the contacts engaged by the wiper 604 are strapped together and to the operating winding of the homing relay 400. Accordingly, the homing relay intermittently operates and releases in synchronism with the operation and release of the motor magnet 600 to advance the wipers controlled thereby to their normal home position shown in Figs. 6, 7, and 8 of the drawings. In this position the routine operation of the identification test equipment 120 is terminated and this equipment is restored to its normal condition capable of again being placed in operation by the application of a ground pulse from the clock and calendar circuit 133 to the start conductor 291.

The above operation of the identification test equipment 120 has been described on the basis of the assumption that the information provided by the sized identifier sender in each of the test positions corresponded with the known designation information registered by the rotary program switch. The satisfactory completion of each of these tests enabled the testing or routining cycle of the program switch to be completed. However, when an incorrect designation is provided by the subscriber identifying means, an alarm indication is provided and the cycle of operation of the program switch is arrested.

More specifically, assuming that in the first stepping position of the program switch in which the known designation is "1111," an improper operation in the seized identifier sender or in the identification matrix 128 or in the identifier circuit 130 causes the transmission of two mark pulses to the thousands register switch, the wiper 804 is moved into engagement with the second contact in the contact bank 805. When the contacts 332 are closed to initiate the digit checking operation, the tens-units check relay 520 is operated and the lower operating winding of the thousands-hundreds check relay 510 is energized as described above. However, since the wiper 890 is in engagement with its first contact which is strapped to the first contact in the bank 805, and, since the wiper 804 is in engagement with the second contact, the ground forwarded through the closed contacts 445 to the common contact in the bank 805 is not extended through the series resistor 513 to energize the upper operating winding of the thousands-hundreds check relay 510. Since this winding is not energized, the contacts 512 remain closed and the contacts 511 remain open. The open contacts 511 prevent the completion of the operating circuit for the reset relay 350.

The closed contacts 512 complete an operating circuit for an alarm relay 410 to indicate the error in determining the known designation. This operating circuit extends from the source of ground provided at the closed contacts 332 through the closed contacts 307, 445, and 512 and a series thermistor 414 to the operating winding of the alarm relay 410. This path is normally completed during the operate time of the thousands-hundreds check relay 510 and the tens-units check relay 520, but the completion of the circuit for this period of time does not result in the operation of the alarm relay 410 due to the time delay provided by a thermistor 414. Accordingly, following a suitable time delay, the alarm relay 410 operates to close a plurality of contacts 411, 412, and 413. The closure of the contacts 411 prepares an operating circuit for a buzzer 420. The closure of the contacts 413 completes a holding circuit for the alarm relay 410 which is shunted around the thermistor 414 and which extends to the same source of operating ground for the alarm relay 410 as described above. The closure of the contacts 412 extends ground to the alarm terminal 281 and to the lamp 280, thereby to provide a visible indication after a predetermined time delay of the alarm condition existing in the identification test equipment 120.

As set forth above, the reset relay 350 is not operated due to the open contacts 511, and, accordingly, the program switch remains in its present position in which a visible display of the incorrect subscriber designation is provided by the illuminated indicating lamps. This display aids the maintenance personnel in locating possible causes of the improper operation in the identification equipment. Further, the illuminated sender lamp, such as the lamp 570, remains illuminated to indicate the identifier sender which was associated with the test equipment 120 when the abnormal operating conditions were encountered. Although the identifier sender which was utilized in supplying the incorrect information to the test equipment 120 is indicated by the selective illumination of one of the lamps 560 or 570, the identifier sender is not held out of operation by the abnormal condition in the test equipment 120 but rather is restored to an idle condition in which it is capable of being subsequently assigned by the identifier sender allotter 129 to perform identification operations on subsequently placed toll calls. In this way, the traffic handling capabilities of the toll ticketing system are not materially impaired during the performance of the routining operation.

The identification test equipment 120 remains in this abnormal alarm condition until it is manually restored to an operative condition by the maintenance personnel. More specifically, this is accomplished by operating a reset key 260 to close a pair of contacts 261. Closure of the contacts 261 applies ground to the operating winding of the reset relay 350, and the operation of this relay clears the incorrect information from the thousands digit, hundreds digit, tens digit, and units digit, and space pulse register switches and permits the rotary program switch to continue and complete its normal cycle of operation. When the display relay 330 is released incident to operation of the reset relay 350, the contacts 332 open to remove ground from the winding of the alarm relay 410 so that this relay releases to restore the equipment 120 to its normal operating condition.

In the event that a seized identifier sender fails to receive any digits of the designation from the identifier circuit 130 and the identification matrix 128 within a selected time interval, grounded battery is applied to a common no-identification conductor 283, as described in the above identified copending Harris application. This selected time interval expires during the interval in which the identify relay 320 is maintained operated so that the grounded battery applied to the conductor 283 is extended to the upper operating winding of the no-identification relay 500, thereby causing the operation thereof. In operating, the relay 500 closes a plurality of contacts 501 and 502. The closure of the contacts 502 completes a holding circuit for the lower operating winding of the relay 500 extending to the ground provided at the contacts 335 which are previously closed by the operation of the display relay 330. The closure of the contacts 501 completes an obvious energizing circuit for a no-identification alarm lamp 550.

When a no-identification indication is provided by one of the identifier senders, thus indicating that no mark pulse information can be transmitted from the seized identifier sender to the identification test equipment 120, four space pulses are transmitted in place thereof. These four space pulses cause the selective operation of the motor magnet 450 in the space pulse register switch so that the wipers 451 and 453 are advanced to provide an indication that only space pulses have been received when the display operation is subsequently initiated by the release of the sender relay 300. Accordingly, the identification test equipment 120 includes means for providing an indication when the identifier sender is not provided with any subscriber designation information from the identifier circuit 130.

The no-identification relay 500 and the no-identification lamp 550 remain operated and energized until such time as the display relay 330 is released. Since the check relays 510 and 520 do not operate because of the failure to identify the correct designation, the alarm relay 410 operates, as described above, to provide an alarm indication. When the reset key 260 is manually operated to operate the reset relay 350, the motor magnet 600 operates to open the contacts 601, thereby releasing the display relay 330, the alarm relay 410, and the no-identification relay 500 and returning the test equipment to a normal routining operation as described above.

In addition to being automatically placed in operation to perform a routining operation, the identification test equipment 120 can be placed in operation by momentarily operating a routine key 250 to close a pair of contacts 251. The closure of the contacts 251 applies a momentary ground to the lower operating winding of the routine relay 340, thereby causing this relay to operate to perform the same functions described above. In closing the contacts 347, the operation of the routine relay 340 completes a holding circuit extending to the normally closed and grounded contacts 401 controlled by the homing relay 400. This holding circuit maintains the routine relay 340 operated until such time as the cycle of operation of the equipment 120 is completed as indicated by the operation of the homing relay to open the holding circuit for the routine relay 340. This operation of the identification test equipment 120 in response to manual actuation of the routine key 250 is identical to that described above.

The test equipment 120 is also capable of being placed in operation to perform an endless sequence of routining operations by the manual actuation of a routine repeat key 240, which is of a locking type. In operating the key 240, a plurality of contacts 241 and 242 are closed. The closure of the contacts 241 again applies ground to the lower operating winding of the routine relay 340, thereby to cause the operation of this relay. Since the contacts 241 remain locked closed, the routine relay 340 remains in operation until the key 240 is manually released. Accordingly, when the rotary program switch controlled by the motor magnet 600 reaches the end of a single cycle of operation, as indicated by the wipers moving to their normal home position, the wiper 604 again completes the above described circuit for stepping the program switch to start another cycle of operation. These repeated cycles of operation of the rotary program switch continue until such time as the manual key 240 is released or until an abnormal operating condition is encountered which results in the operation of the alarm relay 410.

The closure of the contacts 242 supplies direct ground to the normally open contacts 411 controlled by the alarm relay 410. Therefore, if an alarm condition is produced during the performance of a routine repeat operation, the closure of the contacts 411 interconnects the operating winding of the buzzer 420 with the closed and grounded contacts 242 to provide an audible indication that an alarm condition has been encountered in the identification test equipment 120. By the provision of the routine repeat means including the provision for the audible alarm, it is possible for the maintenance personnel to initiate a routining operation of the identification test equipment which will continue until such time as an alarm is established as an indication that a failure in the automatic calling line identifying means associated with the toll ticketing facilities has been encountered. This permits the maintenance personnel to operate the identification test equipment without continuous supervision inasmuch as all of the data pertaining to the incorrect identification which caused the alarm condition is maintained until it is manually cleared.

Although the routining operation has been described above in conjunction with a particular programming pattern in which the identification signals are supplied to ten resistance clusters, similar to the clusters 210 and 220, which represent ten groups of four identical digits, i. e. "1111"–"0000," different permutations of digits may be used for the known test designations by varying the strapping between the contacts engaged by the wipers 624, 654, 724, and 804 and the contacts engaged by the wipers 606, 608, 710, and 890. Further, the routining operation has been described in conjunction with an automatic identification system which provides four digits of information for each identified designation. Four digits will normally be provided in a ten thousand line office when the lines are of the private type. However, in the event that lines are of the terminal per line multiparty type, the identification matrix, as described in the above identified copending Morris et al. application, may provide thousands, hundreds, and tens digits and an arbitrary units digit, the true value of the units digit of the designation being provided by an item of information recorded in one of the trunk recorders under the control of dial impulses.

As indicated above, when terminal per line multiparty subscribers are being identified, an arbitrary units digit is generally provided by the automatic calling line identifying means in order to provide an identical number of units of information in conjunction with calls extended from different types of lines. Usually, the units digit provided by the automatic calling line identification equipment on calls extended from terminal per line multiparty lines has a value of "1" in order to reduce the amount of space on the magnetic tape in the trunk recorders which is required to record this information. Since the wiper 606 and the contact bank 607 associated therewith provide marking conditions representing units digits of increasing value, i. e. 1 to 9 and 0, the identification test equipment 120 must be modified to permit the automatic routining of lines of the multiparty type. This is easily accomplished in the circuit of the present invention by strapping all of the contacts engaged by the wipper 606 to the first contact in the contact bank 625. Accordingly, when the check operation is performed in any of the stepping positions of the rotary program switch, the check circuit for the lower operating winding of the tens-units check relay 520 is completed through the wiper 624 and the strapping to all of the first twenty contacts in the bank 607 engaged by the wiper 606.

Further, in some applications it may be desirable that the automatic calling line identification means in the toll ticketing system provide only thousands, hundreds, and tens digits rather than these three digits in combination with an arbitrary units digit. When information of this type is provided by the automatic toll ticketing facilities, a jumper 599 is connected between a pair of terminals 597 and 598. The terminal 598 is directly connected to the ground provided through the closed contacts 445, 307, and 332 which initiates the digit checking operation of the identification test equipment 120. The terminal 597 is directly connected to one end of the series resistor 524 so that, when the jumper 599 is connected between the terminals 597 and 598, the lower operating winding of the tens-units check relay 520 is operated. This circuit, in effect, bypasses the digit checking circuit afforded by the wiper 606 of the rotary program switch and the wiper 624 of the units digit register switch.

As indicated above, the identification test equipment 120 is capable of being utilized to check the accuracy of the strapping between the individual line circuits, such as the line circuit 110, and the identification matrix 128 in order to insure that, prior to cutover or following a change in the assignment of directory numbers to calling subscribers, the automatic calling line identifying means in the toll ticketing system will operate to correctly identify each calling line. In order to utilize the test equipment 120 in this manner, the clip 290 is connected to the HS terminal or multiple of a line circuit, such as the line circuit 110, or to any other portion of the circuit which is individual to a given subscriber. This clip provides a means for supplying the test signals to the line whose identification is to be checked.

To provide a registration in the test equipment 120 of the digits forming the correct designation of the subscriber that is to be identified, a plurality of selector switches 610, 640, 730, and 810 are provided. These switches are manually adjusted to settings representing the values of the four digits forming the directory number or other designation of the subscriber to be automatically identified. Assuming that the automatic identification of the designation of the substation A, which has been assigned the directory number of "5432," is to be checked, a wiper 611 of the units digit selector switch 610 is adjusted to "2" representing contact 612 (Fig. 6). In a similar manner, a wiper 641 of the tens digit selector switch 640 is adjusted to a contact 642 representing the digit "3" (Fig. 6), a wiper 731 of the hundreds digit selector switch 730 is adjusted to engage a contact 732 representing the hundreds digit "4" (Fig. 7), and a wiper 811 of the thousands digit selector switch 810 is adjusted to engage a contact 812 representing the thousands digit "5" (Fig. 8). The adjusted positions of the selector switches 610, 640, 730, and 810 provide marking conditions of a four digit registration of the correct directory number of the subscriber having the line circuit to which the clip 290 has been attached.

The identification test equipment 120 is placed in operation by manually actuating an identify key 270 to close a pair of contacts 271. The identify key 270 is of a non-locking type so that the contacts 271 are only closed to provide a momentary ground which energizes the operating winding of the identification start relay 360. The operation of this relay, as described above, closes the contacts 361, 362, and 363, the closure of the contacts 363 providing a holding ground to maintain the identification start relay 360 operated following the release of the identify key 270. The closure of the contacts 361 and 362, as described above, places the identifier sender allotter 129 in operation to associate an idle identifier sender, such as the unit 131, with the identifier circuit 130 and the test equipment 120.

As described in detail above, the association of an idle identifier sender with the test equipment 120 and with the identifier circuit 130 causes the operation of the sender relay and the display relay 330, the operation and release of the identify relay 320, and the release of the identification start relay 360. The operation of the identify relay 320, in closing the contacts 322, extends the alternating current identification potential or test signal from the toll ticketing power supply 230 through the closed contacts 343*a* to the test clip 290. Since this test clip is secured to the HS multiple of the line circuit 110 individual to the calling substation A having the designation "5432," the test potential is applied to a resistance cluster 200 including individual resistance elements 201, 202, 203, and 204. These resistance elements supply the identification potential to the "5" manifesting conductor in the thousands digit cable 205, the "4" manifesting hundreds conductor in the hundreds digit cable 206, the "3" manifesting conductor in the tens digit cable 207, and the "2" manifesting conductor in the units digit cable 208.

The selective energization of these four conductors operates the identifier circuit 130 to supply the seized identifier sender 131 with information representing the designation of the substation A. The identifier sender 131 then provides the identification test equipment with four groups of mark pulses including five, four, three, and two pulses which are separated from each other by space pulses. These four groups of mark pulses operate the motor magnets 800, 720, 650, and 620 to store the values of the thousands, hundreds, tens, and units digits, as described above. The four interposed space pulses operate the motor magnet 450 to advance the space pulse register switch in the manner described above.

The test equipment 120, following the pulse transmission from the associated identifier sender, normally provides a visible display of the identified subscriber designation and does not use the digit checking facilities to provide an alarm if the designation is incorrect. More specifically, when the sender relay 300 is released in response to the completion of the transmission of the mark and space pulse information from the seized identifier sender to the thousands, hundreds, tens, and units digit register switches in the identification test equipment 120, the contacts 306 are opened to interrupt the operating circuit for the display relay 330. However, the opening of the operating circuit for the display relay 330 does not permit this relay to release at this time inasmuch as this relay is rendered slow-to-release by the timing circuit including the condenser 481 and the resistance 482, the condenser 481 discharging through the winding of the display relay 330 through the resistance 482 and the closed contacts 443.

The release of the relay 300 also closes the contacts 307 to complete the circuit for applying ground from the closed contacts 332 over the conductor 485 to the common contacts in the contact banks 627, 791, 727, and 807. The ground supplied by the closure of the contacts 307 operates, as described above, to provide a visible indication of the number of space pulses transmitted from the identifier sender and also of the values of the thousands, hundreds, tens, and units digits of the directory number of the calling substation A. However, since the check relay 440 is not operated at this time to close the contacts 445, the ground provided by the closure of the contacts 307 is not extended to the digit checking circuits so that the thousands-hundreds check relay 510 and the tens-units check relay 520 are ineffective during an identifying operation. Therefore, the sole indication of the correctness of the strapping to the identification matrix 128 is provided by the visual display afforded by the indicator lamps 673, 793, 740, and 850.

Following a suitable time delay, the discharge current of the condenser 481 is no longer sufficient to maintain the display relay 330 operated, and this relay releases to open the contacts 332 and to close the contacts 333, among others. In opening the contacts 332, the visible display provided by the indicator lamps is terminated. The closure of the contacts 333 provides operating ground to the plurality of reset magnets in the register switches and thus restores the identification test equipment 120 to its normal condition.

In order to permit the automatic digit checking features of the identification test circuit 120 to be utilized during an identification operation initiated by the operation of the identify key 270, a locking identification check key 370 is operated to close a pair of contacts 371 and to open the contacts 372. The opening of the contacts 372 interrupts the above described operating circuit for the motor magnet 600 controlled by the reset relay 350. The ground provided by the closed contacts 371 is extended to the operating winding of the check relay 440, thereby operating this relay, as described above, to close the contacts 441, 442, 444, 445, and 446 and to open the contacts 443.

The closure of the contacts 441 together with the opening of the contacts 443 removes the slow-to-release timing circuit from the operating winding of the display relay 330. The closure of the contacts 445 prepares the above described circuit for extending ground to the common contacts in the contact banks 805, 725, 655, and 625 of the thousands, hundreds, tens, and units digit register switches. The closure of the contacts 446 prepares an operating circuit for the identification start relay 360, and the closure of the contacts 444 prepares an operating circuit for the reset relay 350.

Accordingly, when the identify key 270 is operated to close the contacts 271, the identification start relay 360 is operated, as described above, to cause the association of an idle identifier sender with both the identifier circuit 130 and the identification test equipment 120. This association again operates the sender relay 300 and the display relay 330, operates and releases the identify relay 320, and releases the identification start relay 360. When the sender relay 300 is released following the termination of the transmission of the mark and space pulse information, the opening of the contacts 306 interrupts the operating circuit for the display relay 330, but this relay remains operated on the above described holding circuit extending through the closed contacts 442. The closure of the contacts 307 in response to the release of the sender relay 300 completes the above described circuits for extending ground to illuminate the lamp displays and also to the common contacts in the contact banks 625, 655, 725, and 805 in the digit checking circuits. This latter ground is extended through the contacts engaged by the wipers 624, 654, 724, and 804 to the similarly designated contacts of the selector switches 610, 640, 730, and 810.

If the digital information provided by the seized identifier sender corresponds to the known designation of the substation A, as determined by the selective settings of the selector switches, the wipers 611, 641, 731 and 811 extend this ground through the contacts 348*a*, 345*a*, 342*a*, and 349, which remain closed since the routine relay 340 is not operated, to the operating windings of the thousands-hundreds check relay 510 and the tens-units check relay 520. These two relays are selectively operated to close the contacts 511 and 521 to provide an indication that the information transmitted from the automatic calling line identification facilities of the toll ticketing equipment corresponds with the digital information effectively registered in the identification test circuit 120 by the selector switches 610, 640, 730, and 810.

The closure of the contacts 511 and 521 completes an operating circuit for the reset relay 350, the operation of which, as described above, releases the display relay 330 and the off-normal relay 430, and energizes the reset magnets 630, 660, 720, and 810 to restore the stepping switches to their normal positions. The rotary program switch, however, is not advanced by the closure of the contacts 352 since the contacts 372 are now open. The release of the display relay 330, in opening the contacts 332, releases the reset relay 350. The identify key 270 can be repeatedly operated while the identify check or repeat key 370 remains operated to check the same line for possible intermittent failure of identification.

Following the completion of the test, the identify check or repeat key 370 is released to open the contacts 371 and to close the contacts 372. The opening of the contacts 371 releases the check relay 440, and the closure of the contacts 372 prepares the above described homing circuit for the rotary program switch, which circuit is not effective to produce movement thereof since this switch has not been advanced from its normal home position. The above operations return the test equipment 120 to its normal condition.

To provide an error indication when an identifying operation is initiated by the manual operation of the identify key and the identify check key, the alarm relay 410 is operated. More specifically, in the example set forth above in which the selector switches are adjusted to provide a known designation "5432" representing the calling substation A and the clip 290 is attached to the HS line multiple individual to the line circuit 110, the operation of the identification check key 370 operates the check relay 440. The momentary operation of the identify 270 to momentarily close the contacts 271 operates the identification start relay 360 so that, as described above, an idle identifier sender, such as the unit 131, is associated with both the identification test equipment 120 and the common identifier circuit 130 under the control of the identifier sender allotter 129. This association operates the sender relay 300 and operates and releases the identify relay 320, the operation of the sender relay 300 also operating the display relay 330. The operation of the identify relay 320 closes the contacts 322 so that the test potential is extended through the contacts 343*a* to the HS multiple of the line circuit 110, thereby to selectively energize the identification matrix 128 and the identifier circuit 130.

Assuming that the strapping of the conductor 140*a* between the HS multiple and the identification matrix 128 is defective so that the "3" hundreds conductor in the hundreds cable 206 is energized rather than the correct "4" hundreds conductor, the seized identifier sender 131 will transmit five thousands mark pulses, three hundreds mark pulses, three tens mark pulses, and two units mark pulses. The application of these pulses to the register switches in the identification test equipment 120 moves the wiper 804 to its fifth stepping position, the wiper 724 to its third stepping position, the wiper 654 to its third stepping position, and the wiper 624 to its second stepping position.

The release of the sender relay 300 in response to the completion of the transmission of these pulses from the seized identifier sender 131 to the identification test equipment 120 closes the contacts 307 so that ground is forwarded over the common display conductor 485 to provide a visible indication of the erroneous designation "5332," thereby visibly indicating to the maintenance personnel that the hundreds digit of the designation of the substation A is incorrect and thus indicating that either the identifier circuit 130 or the seized identifier sender 131 is operating improperly or that the strapping between the HS terminal and the identificatiton matrix 128 is incorrect.

In addition, the ground provided by the closure of the contacts 307 is extended through the closed contacts 445 to be applied to the common contact in the contact banks 625, 655, 725, and 805. This ground is forwarded through the wipers 624, 654, and 804 and the switch arms 611, 641, and 811 to energize both of the windings of the tens-units check relay 520 and the upper winding of the thousands-hundreds check relay 510. The ground supplied to the wiper 724 is not forwarded to the lower winding of the relay 510 since the switch arm 731 engages the "4" representing contact 732 and the wiper 724 engages the "3" representing contact in the bank 725. The energization of both of the windings of the tens-units check relay 520 operates this relay to close the contacts 521 to prepare an operating path for the reset relay 350. However, since only the upper operating winding of the thousands-hundreds check relay 510 is energized, the contacts 511 remain open and the above described operating path for the reset relay 350 is not completed. However, the ground provided at the closed contacts 445 is extended through the closed contacts 512 to complete the above described operating circuit for the alarm relay 410, this relay operating after a suitable time delay as determined by the series thermistor 414.

In operating, the alarm relay 410 closes the contacts 411, 412, and 413, the closure of the contacts 413 serving to complete a holding circuit for the alarm relay 410 which is shunted around the thermistor 414. The closure of the contacts 412 again provides a time delayed visible indication of the alarm condition in the identification test equipment 120. The closure of the contacts 411, as contrasted with the operation of the equipment 120 during a routining operation, causes the immediate energization of the buzzer 420 inasmuch as the contacts 345 controlled by the routine relay 340 are now closed to provide ground for the operating winding of the buzzer. This audible alarm provides an indication to the maintenance personnel that the designation of the substation A has not been correctly identified.

This alarm condition remains until such time as the reset key 260 is operated to complete the energizing circuit extending through the closed contacts 444 to the operating winding of the reset relay 350. The operation of this relay, as described above, releases the display relay 330 and the release of this relay releases the check relay 520 and the alarm relay 410. The release of the alarm relay 410 terminates the audible and visible alarms. Further, the release of the display relay 330 operates the plurality of register switch reset magnets and thereby releases the off-normal relay 430. When the reset key 260 is released to open the contacts 261, the reset relay 350 is released so that the test equipment 120 can be returned to its normal condition by opening the key 370 to release the check relay 440.

Although the identification test equipment 120, in its identify and identify check operations, has been described in conjunction with displaying and checking a subscriber designation including the thousands, hundreds, tens, and units digits which normally are provided for private lines in a ten thousand line office, it is obvious that the operation thereof can easily be modified to accommodate the identification of terminal per line multiparty lines in which an arbitrary digit is transmitted by the automatic calling line identifying means by strapping all of the contacts of the units selector switch 610 to the contact thereof which represents the arbitrary digit. Further, in the event that the units digit of the directory number of terminal per line multiple party subscribers is not provided by the automatic calling line identifying means, the jumper 599 may be connected between the terminals 597 and 598 so that, as described above, the lower operating winding of the tens-units check relay 520 is directly operated by the ground supplied at the closed contacts 445 at the initiation of the digit checking operation.

Accordingly, the identification test facilities 120 of the present invention provide a means for automatically routining or checking the common amplifying, detecting, registering, and pulsing components of the automatic calling line identification facilities in a toll ticketing system. This routining operation may take place automatically at selected chronological intervals without requiring the manual intervention of maintenance personnel and without requiring the continuous presence of the maintenance personnel to observe any inadequacies in the operation of the calling line identifying equipment. Further, the test equipment 120 of the present invention is capable of automatically providing a visual display of any selected calling line designation and of also providing an automatic check over the accuracy of the information provided by the automatic calling line identification facilities. This test equipment is easily operated and, although it may form a permanent part of an automatic toll ticketing installation, does not interfere with the normal and intended operation thereof.

While the operation of the identification test equipment of the present invention is described above in conjunction with particular means for automatically determining the identification or designation of a subscriber, it should be understood that many other modifications and embodiments may be provided by those skilled in the art which will fall within the spirit and scope of the principles of the present invention.

What is claimed and desired to be secured by Letters Patent of the United States is:

1. A testing apparatus for use with means for determining subscriber designations comprising means for successively applying test signals to said determining means representing different subscriber designations to operate said determining means to determine the subscriber designations represented by the test signals, means for successively establishing registrations in accordance with said different designations, and means controlled by said determining means and said establishing means for providing an indication when said established registrations do not correspond with the designations determined by said determining means in response to said test signals.

2. In a telephone system including calling line designation identifying means having connections to lines to be identified, a source of test signals, means for applying said test signals to a line having a known designation, first means for registering said known designation, second means controlled by operation of said identifying means in accordance with said test signals for registering the line designation established by said identifying means, and means controlled by said first and second register means for indicating the accuracy of the operation of said identifying means.

3. A telephone system comprising automatic identifying means for determining the designation of a subscriber, switch means adjustable to positions representing the designation of a given subscriber, signaling means providing said identifying means with a signal representative of said given designation, registering means controlled by said identifying means for storing a designation determined by said identifying means in response to said signal, and means controlled by said registering means and said switch means for providing an indication when the said designation determined by said identifying means is not correct.

4. A testing apparatus for use with a subscriber identifying means which determines the designation of a subscriber comprising means for sequentially applying a series of different test signals to said identifying means representative of a plurality of different subscriber designations, register means sequentially operative to conditions representative of said different subscriber designations, said identifying means providing signals representative of said different subscriber designations in accordance with said different test signals, signal storing means controlled by said signals provided by said identifying means, and designation checking means controlled by said register means and by said signal storing means for providing an indication when any of the signals provided by said identifying means are not representative of the subscriber designation manifested by said register means.

5. A testing apparatus for use with a subscriber identifying means which determines the designation of a subscriber comprising switching means for sequentially applying test signals to said identifying means representative of different subscriber designations, first register means sequentially operative to settings representative of said different subscriber designations, said identifying means providing signals representative of said different subscriber designations in accordance with said test signals, second register means controlled by the signals provided by said identifying means, and means controlled by said first and second register means when the designations stored therein correspond for operating said switching means to apply another test signal to said identifying means.

6. The apparatus defined by claim 5 in which the said means controlled by the first and second register means includes means for preventing operation of said switching means when the designations stored in the first and second register means do not correspond.

7. The apparatus defined by claim 5 in which the said means controlled by the first and second register means includes means for adjusting said first register means to a setting representative of the designation corresponding to said another test signal.

8. In combination with an automatic calling line identifying means having a plurality of different digit detecting and storing channels for detecting and storing the different digits in each of the orders of a multidigit subscriber designation, a source of test signals, means for sequentially applying said test signals to each of said channels in each of said orders, first register means operable to digit representing conditions corresponding to the channels to which the test signals are applied, second register means associated with said channels and operable to digit representing conditions in accordance with the signal output from said channels, separate means controlled by said first and second register means for checking the identity of the digit representing conditions in said first and second register means in each of the orders of said multidigit designation, and means for comparing the digit representing conditions established in the first and second register means.

9. The combination set forth in claim 8 in which means are provided for continuously operating the applying means to apply test signals to the channels until the digit representing conditions in said first and second register means do not correspond.

10. In combination with an automatic calling line identifying means having a plurality of different digit detecting and storing channels for detecting and storing the different digits in each of the orders of a multidigit subscriber designation, a source of test signals, means for applying said test signals to a channel in each of said orders, first register means operable to digit representing conditions corresponding to the channels to which the test signals are applied, second register means associated with the output from said channels and operable to digit representing conditions in accordance with the signal output from said channels, and separate means controlled by said first and second register means for checking the identity of the digit representing conditions in said first and second register means in each of the orders of said multidigit designation.

11. The combination set forth in claim 10 in which means are provided for selectively rendering one of said separate means ineffective to check the digit representing conditions in one of the orders of said multidigit designation.

12. In combination with identifying means for determining the designation of a subscriber, a source of test signals, means for applying said test signals to said identifying means in accordance with a known designation to provide output signals, first register means controlled by said output signals to provide designation representing conditions in accordance therewith, second register means adjustable to conditions representing said known designation, third register means adjustable to conditions representing said known designation, designation checking means controlled by the designation representing conditions in said first register means and one of said second and third register means to provide an indication of the operation of said identifying means, and means for selectively rendering one of said second and third register means effective to control said designation checking means.

13. The combination defined by claim 12 in which the third register means comprises manually operated switch means adjustable to settings corresponding to said known designation.

14. The combination defined by claim 12 in which the means for applying the test signals comprises first switching means for sequentially applying test signals to said identifying means representing a plurality of different known designations and in which said second register means comprises second switching means operable in synchronism with said first switching means to sequentially establish a series of different conditions representing said plurality of different known designations.

15. A telephone system including subscriber lines comprising identifying means for automatically determining the designation of said subscriber lines, testing means for supplying a signal representing a known designation to said identifying means and for determining the designation provided by said identifying means in response to said signal, and means for selectively associating said identifying means with said testing means to check the operation of said identifying means.

16. The telephone system set forth in claim 15 in which means are provided for automatically placing said associating means in operation at selected chronological intervals.

17. A telephone system including a plurality of lines comprising calling line identifying means common to said lines and adapted to provide signals representing the designation of a calling line, means for storing said signals, switch means for associating said line identifying means with said storing means, testing means including means for establishing an artificial calling condition representing a line of a known designation, means for operating said switching means to associate said identifying means with said testing means, and means in said testing means responsive to signals supplied from said line identifying means for providing an indication when the signals supplied from said line identifying means do not represent said known designation.

18. A telephone system including a plurality of lines comprising calling line identifying means common to said lines and adapted to provide signals representing the designation of a calling line, means normally operative in response to the extension of a connection from one of said lines for operating said identifying means to supply signals representing the designation of said one line, testing means including means for establishing an artificial calling condition representing a line of a known designation, control means for rendering said testing means effective to operate said calling line identifying means by establishing said artificial calling line condition in said identifying means, and means controlled by said testing means when said artificial calling condition is established in said identifying means for providing an indication if the designation signals supplied by said identifying means do not correspond to said known designation.

19. A telephone system including a plurality of lines comprising a plurality of calling line identifying means common to said lines and each adapted to provide signals representing the designation of a calling line, allotting means responsive to the extension of a connection from one of said lines for rendering one of said identifying means effective to provide signals representing the designation of said one line, testing means common to said identifying means and including means for determining the accuracy of operation of said identifying means, and means for operating said allotting means to render said testing means effective to test the operation of one of said identifying means.

20. The telephone system set forth in claim 19 including means for preventing said allotting means from rendering one of said identifying means concurrently effective to determine the designation of a calling line and responsive to control by said testing means.

21. In a telephone system, a plurality of calling lines each having an individual designation, calling line identifying means common to said lines and operable in response to the extension of a connection from one of said lines to determine the designation of said one line, testing means for checking the accuracy of operation of said identifying means, and clock controlled means for rendering said testing means effective to check the operation of said identifying means at selected chronological intervals.

22. The telephone system set forth in claim 21 including means for preventing operation of identifying means to determine the designation of a calling line during the interval in which said testing means is effective.

23. In a telephone system, subscriber identifying means controlled by an applied signal for automatically determining the designation of a subscriber, test means connected to said identifying means for supplying a test signal to said identifying means representing a known designation, and means controlled by said test means and said identifying means for providing an indication when said identifying means fails to correctly determine the known designation represented by the test signal applied to said identifying means.

24. In a telephone system, subscriber identifying means controlled by an applied signal for automatically determining the designation of a subscriber, test means connected to said identifying means for supplying a series of distinct test signals to said identifying means representing a group of known designations, and means controlled by said test means and said identifying means for providing an indication when said identifying means fails to correctly determine any one of the known designations represented by the series of signals applied to said identifying means.

25. An automatic toll ticketing system comprising a plurality of lines, means for extending connections from said lines, register means controllable from said extending means for storing items of information pertaining to calls placed over said connections, calling line identifying means common to said plurality of lines and operable in response to the extension of a connection from a given one of said plurality of lines for automatically determining the designation of said given one of said lines and for providing signals representing said determined designation, test means for determining the accuracy of operation of said identifying means and including means for supplying a test signal to said calling line identifying means representing a known designation so that said identifying means provides signals representing said known designation, and switching operable when said identifying means is operated in response to the extension of a connection for connecting said identifying means to said register and operable when said identifying means is operated by said test signal for connecting said identifying means to said test means.

References Cited in the file of this patent

UNITED STATES PATENTS

| | | |
|---|---|---|
| 2,297,365 | Ostline | Sept. 29, 1942 |
| 2,447,533 | Retallack | Aug. 24, 1948 |